(12) United States Patent
Ayai et al.

(10) Patent No.: US 9,627,995 B2
(45) Date of Patent: Apr. 18, 2017

(54) INVERTER DEVICE WITH A CONTROL UNIT

(71) Applicant: Sumitomo Electric Industries, Ltd., Osaka-shi (JP)

(72) Inventors: Naoki Ayai, Osaka (JP); Kenji Abiru, Osaka (JP); Toshiaki Okumura, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/890,882

(22) PCT Filed: May 22, 2014

(86) PCT No.: PCT/JP2014/063610
§ 371 (c)(1),
(2) Date: Nov. 12, 2015

(87) PCT Pub. No.: WO2014/199796
PCT Pub. Date: Dec. 18, 2014

(65) Prior Publication Data
US 2016/0126863 A1    May 5, 2016

(30) Foreign Application Priority Data

Jun. 11, 2013 (JP) ................................. 2013-122665

(51) Int. Cl.
*H02M 7/5387* (2007.01)
*H02M 1/12* (2006.01)
(Continued)

(52) U.S. Cl.
CPC ....... *H02M 7/53871* (2013.01); *H02M 1/126* (2013.01); *H02M 1/14* (2013.01);
(Continued)

(58) Field of Classification Search
CPC ......... H02M 7/5387; H02M 1/12; H02M 1/14
See application file for complete search history.

(56) References Cited

U.S. PATENT DOCUMENTS

2012/0201064 A1    8/2012    Asakura et al.

FOREIGN PATENT DOCUMENTS

| EP | 1753634 B1 | 5/2010 |
| EP | 2693288 A1 | 2/2014 |

(Continued)

OTHER PUBLICATIONS

Office Action in Japanese Patent Application No. 2014-104326, dated Jun. 24, 2014.
(Continued)

*Primary Examiner* — Emily P Pham
(74) *Attorney, Agent, or Firm* — Venable LLP; Michael A. Sartori

(57) ABSTRACT

An inverter device includes: a step-up circuit; an inverter circuit; a control unit for controlling the step-up circuit and the inverter circuit; and a reactor provided on an electric path for outputting the converted AC power to an AC system. An output current target value is calculated based on an input power value of DC power and a voltage value of the AC system, and a current target value and a voltage target value for the inverter circuit are calculated based on the output current target value, to control the inverter circuit. A current target value for the step-up circuit is calculated based on a current target value and a voltage target value that are common with the inverter circuit, and on a DC input voltage value, to control the step-up circuit. Thereby, output of the AC power is controlled.

13 Claims, 18 Drawing Sheets

(51) Int. Cl.
  *H02M 1/14* (2006.01)
  *H02M 1/42* (2007.01)
  *H02M 1/00* (2006.01)

(52) U.S. Cl.
  CPC ....... *H02M 1/4266* (2013.01); *H02M 7/5387* (2013.01); *H02M 2001/007* (2013.01); *Y02B 70/123* (2013.01)

(56) References Cited

FOREIGN PATENT DOCUMENTS

| | | |
|---|---|---|
| JP | 62-200413 | 4/1987 |
| JP | H08-44446 A | 2/1996 |
| JP | 2000-152651 A | 5/2000 |
| JP | 2000-341862 A | 12/2000 |
| JP | 2002-369544 A | 12/2002 |
| JP | 2002-374681 A | 12/2002 |
| JP | 2003-009537 A | 1/2003 |
| JP | 2003-134667 A | 5/2003 |
| JP | 2003-289626 A | 10/2003 |
| JP | 2003-348768 A | 12/2003 |
| JP | 2005-204485 A | 7/2005 |
| JP | 2005-218157 A | 8/2005 |
| JP | 4195948 B2 | 12/2008 |
| JP | 4200244 B2 | 12/2008 |
| JP | 4379959 B2 | 12/2009 |
| JP | 2010-066919 A | 3/2010 |
| JP | 4468371 B2 | 5/2010 |
| JP | 4487354 B2 | 6/2010 |
| JP | 4622021 B2 | 2/2011 |
| JP | 2011-083170 A | 4/2011 |
| JP | 5618022 B1 | 11/2014 |
| WO | 2005/115788 A1 | 12/2005 |
| WO | WO-2006/033142 A1 | 3/2006 |
| WO | 2012/132948 A1 | 10/2012 |
| WO | 2005/115788 A1 | 2/2017 |

OTHER PUBLICATIONS

International Search Report in International Application No. PCT/JP2014/063610, dated Jul. 15, 2014.
Extended European Search Report in counterpart European Patent Application No. 14811023.2, dated Jan. 31, 2017.
Extended European Search Report in counterpart European Patent Application No. 14811444.0, dated Feb. 7, 2017.

FIG. 16
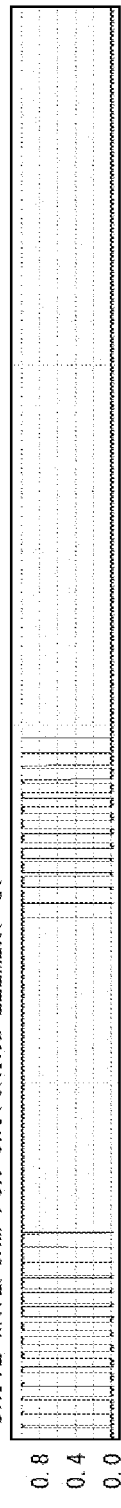
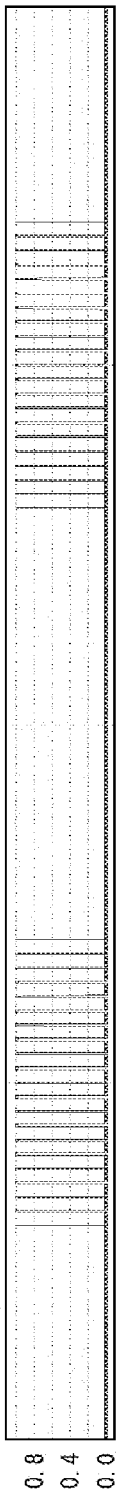
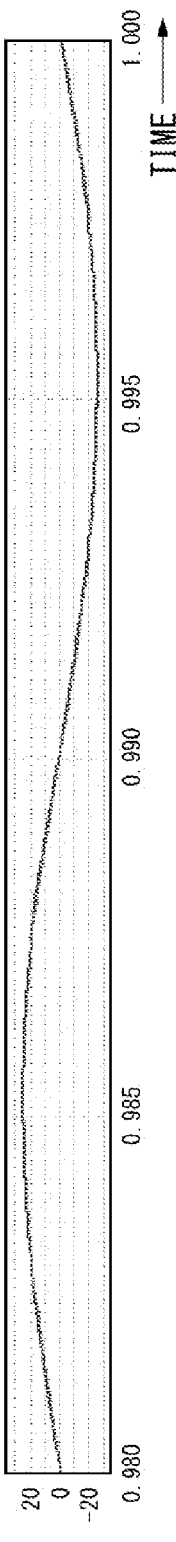

INVERTER DEVICE WITH A CONTROL UNIT

TECHNICAL FIELD

The present invention relates to an inverter device for converting DC power from a DC power supply such as photovoltaic generation to AC power.

BACKGROUND ART

Conventionally, inverter devices have been used which have a system interconnection function for converting input power from a DC power supply such as a solar battery or a storage battery to AC power and superimposing the converted AC power onto an AC system such as commercial power.

Such an inverter device includes a step-up circuit for stepping up voltage of input power, and an inverter circuit for converting output of a step-up circuit to AC power.

As such an inverter device, the following inverter device is proposed. Of a period in which AC power is outputted, the step-up circuit is caused to perform switching operation only during a period in which voltage of the input power supply is lower than an absolute value of AC system voltage, and switching operation of the step-up circuit is stopped during the other period, whereby loss due to switching in the inverter circuit and the step-up circuit is reduced and power can be outputted with increased efficiency (see, for example, Patent Literature 1).

CITATION LIST

Patent Literature

PATENT LITERATURE 1: Japanese Laid-Open Patent Publication No. 2000-152651

SUMMARY OF INVENTION

Technical Problem

In such an inverter device as described above, the absolute value of the AC system voltage and input voltage are compared with each other, and at a moment when they coincide with each other, a period of high-frequency switching is switched between the step-up circuit and the inverter circuit. However, if the high-frequency switching operation is thus switched from the step-up circuit to the inverter circuit at a moment when the absolute value of the AC system voltage coincides with the input voltage, input voltage to the inverter circuit may become insufficient and distortion may occur in output current.

In the case where output voltage of the inverter circuit is controlled to be synchronized with the system voltage, even if the period of high-frequency switching is switched between the step-up circuit and the inverter circuit at a moment when the absolute value of the AC system voltage and the input voltage coincide with each other, a period in which the input voltage to the inverter circuit is insufficient does not occur, and therefore distortion does not occur in the output current. However, at this time, voltage between both ends of an AC reactor is in phase with the AC voltage, and the phase of current flowing in the AC reactor lags the voltage phase of the AC system by 90 degrees. Therefore, the phase of current of AC power outputted via the AC reactor and superimposed onto the AC system lags the AC system voltage by 90 degrees. As a result, it may be impossible to output power compliant with a standard of system interconnection.

In the above inverter device, a step-up reference wave for performing waveform shaping for output current of the step-up circuit or current of a DC reactor so as to have a predetermined waveform and a predetermined magnitude is a squared sine wave obtained by multiplying an inverter reference wave by a ratio between the absolute value of the system voltage and the input voltage. That is, a phase shift of the AC voltage due to the AC reactor, and a current component flowing in an intermediate capacitor (a capacitor provided between the step-up circuit and the inverter circuit) are not taken into consideration. Therefore, in order to output current synchronized with the system voltage and having little distortion, it is necessary to combine complex controls in which the squared sine wave which is the step-up reference wave is outputted in a preceding manner with its phase leading the phase of a sine wave which is the inverter reference wave, and the preceding amount is changed depending on the magnitude of output current.

In the above inverter device, the step-up reference wave which is the squared sine wave and whose magnitude is controlled in accordance with a result of monitoring of the step-up current or the DC reactor current is directly compared with a triangle wave to obtain a gate signal for controlling an ON time of a step-up switching element. However, this method cannot provide output current having a desired waveform and a desired magnitude.

In the above inverter device, since the output current of the step-up circuit is greatly varied within a half cycle of system power, even if the capacitance of a smoothing capacitor connected to an input side is considerably increased, input current does not become perfect DC current, and it is inevitable that the input current becomes pulsating current on which a variation component is superimposed. Therefore, in the case of connecting a power supply, such as a solar battery, which has an optimum operating point at which output power is maximized at a specific current value, it is difficult to perform control at the optimum operating point of the solar battery.

The present invention has been made in view of the above circumstances, and an object of the present invention is to provide an inverter device having periods in which high-frequency switching operations of a step-up circuit and an inverter circuit are each partially stopped, and also having a period in which high-frequency switching is performed while a step-up ratio and a step-down ratio are suppressed to minimum necessary levels, thereby reducing switching loss of a power semiconductor element and iron loss of a reactor to realize high conversion efficiency, and allowing for output of AC current with reduced distortion and an increased power factor in synchronization with system voltage, irrespective of output.

Solution to Problem

The present invention is an inverter device connected to an AC system via a reactor and including: a conversion unit configured to convert DC power outputted from a power supply, to AC power, and output the converted AC power to the AC system via the reactor; and a control unit configured to control the conversion unit. The conversion unit includes: a step-up circuit configured to step up a DC input voltage value of the DC power; and an inverter circuit configured to convert power given from the step-up circuit, to AC power. The control unit calculates an output current target value based on an input power value of the DC power and a voltage value of the AC system, and calculates a current target value and a voltage target value for the inverter circuit based on the output current target value, to control the inverter circuit; also calculates a current target value for the step-up circuit based on a current target value and a voltage target value that are common with the inverter circuit, and on the DC input voltage value, to control the step-up circuit; and thereby controls output of the AC power.

Advantageous Effects of Invention

The inverter device of the present invention can output AC current with high conversion efficiency and reduced distortion in synchronization with an AC system.

BRIEF DESCRIPTION OF DRAWINGS

FIG. 16 is a diagram showing examples of reference waves and drive waveforms for switching elements Qb and Q1 to Q4, and an example of a current waveform (the vertical axis indicates [A]) of AC power outputted from the inverter device, in the second embodiment.

DESCRIPTION OF EMBODIMENTS

Summary of Embodiments

Figure 1:
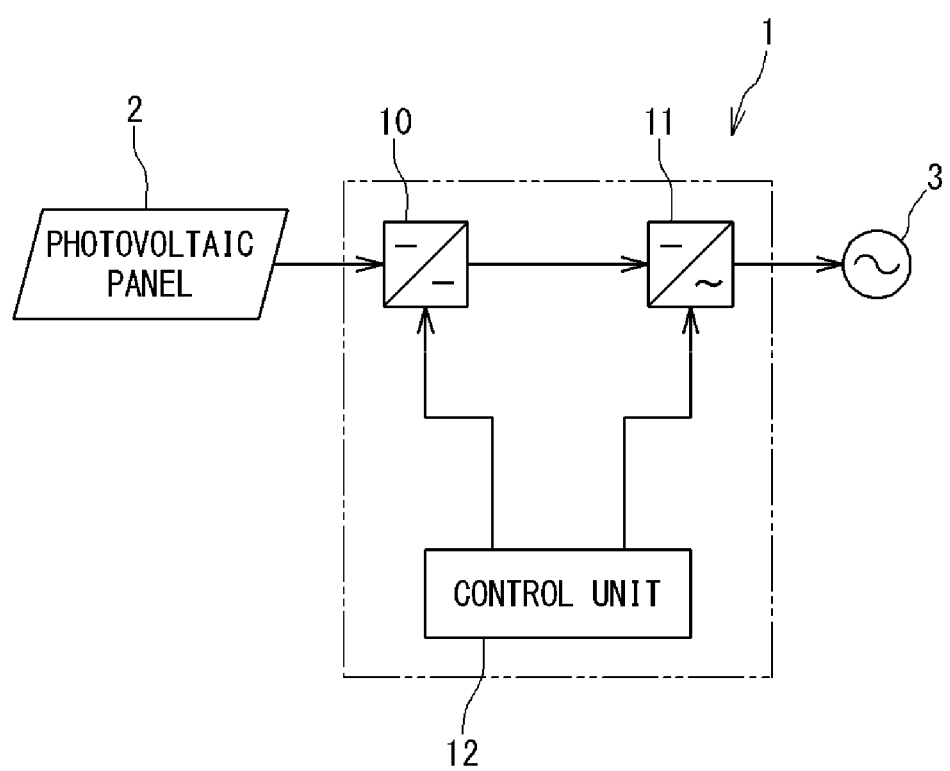
FIG. 1 is a block diagram showing an example of a system including an inverter device according to the first embodiment.

Summary of the embodiments of the present invention includes at least the following.

(1) An inverter device connected to an AC system via a reactor includes: a conversion unit configured to convert DC power outputted from a power supply, to AC power, and output the converted AC power to the AC system via the reactor; and a control unit configured to control the conversion unit. The conversion unit includes: a step-up circuit configured to step up a DC input voltage value of the DC power; and an inverter circuit configured to convert power given from the step-up circuit, to AC power. The control unit calculates an output current target value (Ia*) based on an input power value of the DC power and a voltage value of the AC system, and calculates a current target value (Iinv*) and a voltage target value (Vinv*) for the inverter circuit based on the output current target value, to control the inverter circuit; also calculates a current target value (Iin*) for the step-up circuit based on a current target value (Iinv*) and a voltage target value (Vinv*) that are common with the inverter circuit, and on the DC input voltage value (Vg), to control the step-up circuit; and thereby controls output of the AC power.

The conversion unit controlled by the control unit of the inverter device configured as described above can constantly provide output based on the current target value and the voltage target value for the inverter circuit, to the reactor. The control unit determines target values on an inverter device side without directly depending on a voltage value of the AC system, and can cause the step-up circuit and the inverter circuit to perform desired operations, based on the target values. Therefore, the control unit can control the conversion unit to cause the conversion unit to output AC power having a voltage phase leading the voltage phase of the AC system by several degrees.

That is, since the voltage phase of AC power outputted from the conversion unit is caused to lead the voltage phase of the AC system by several degrees, the phase of voltage between both ends of the reactor can be caused to lead the voltage phase of the AC system by 90 degrees. Since the current phase of the reactor lags the voltage phase thereof by 90 degrees, the current phase of AC power outputted through the reactor is synchronized with the current phase of the AC system.

As a result, AC power having the same current phase as the AC system can be outputted, whereby reduction in a power factor of the AC power can be suppressed.

The inverter device of the above (1) may have specific aspects described in the following (2) to (9), for example.

(2) For example, in the inverter device of the above (1), a smoothing capacitor may be provided between the step-up circuit and the inverter circuit, and the current target value for the step-up circuit may be calculated based on the DC input voltage value and on a value obtained by adding reactive power passing through the smoothing capacitor to a power target value that is based on the current target value and the voltage target value for the inverter circuit.

In this case, it is possible to determine the current target value for the step-up circuit more accurately in consideration of reactive power as well as the power target value for the inverter circuit.

(3) In the inverter device of the above (1), a smoothing capacitor may be provided between the step-up circuit and the inverter circuit, and the current target value for the step-up circuit may be calculated based on the DC input voltage value and on a value obtained by adding reactive power passing through the smoothing capacitor and power loss in the inverter circuit to a power target value that is based on the current target value and the voltage target value for the inverter circuit.

In this case, it is possible to determine the current target value for the step-up circuit more strictly in consideration of reactive power and power loss as well as the power target value for the inverter circuit.

(4) In the inverter device of the above (1), for example, an output smoothing capacitor may be provided at a stage subsequent to the reactor, and in the case where the current target value for the step-up circuit is Iin*, the current target value and the voltage target value for the inverter circuit are Iinv* and Vinv*, respectively, the output current target value is Ia*, an electrostatic capacitance of the output smoothing capacitor is Ca, the voltage value of the AC system is Va, and the DC input voltage value is Vg, the following expressions may be satisfied:

$$Iin^* = (Iinv^* \times Vinv^*)/Vg$$

$$Iinv^* = Ia^* + Ca \times (dVa/dt).$$

In this case, it is possible to determine the current target value for the inverter circuit and the current target value for the step-up circuit in consideration of current flowing through the output smoothing capacitor.

(5) In the inverter device of the above (1), for example, an output smoothing capacitor may be provided at a stage subsequent to the reactor, and in the case where the current target value for the step-up circuit is Iin*, the current target value and the voltage target value for the inverter circuit are Iinv* and Vinv*, respectively, the voltage value of the AC system is Va, the DC input voltage value is Vg, the output current target value is Ia*, and current flowing through the output smoothing capacitor is Ica, the following expressions may be satisfied:

$$Iin^* = (Iinv^* \times Vinv^*)/Vg$$

$$Iinv^* = Ia^* + Ica.$$

In this case, it is possible to determine the current target value for the inverter circuit and the current target value for the step-up circuit in consideration of current flowing through the output smoothing capacitor.

(6) In the inverter device of the above (2), for example, in the case where the current target value for the step-up circuit is Iin*, the current target value and the voltage target value for the inverter circuit are Iinv* and Vinv*, respectively, an electrostatic capacitance of the smoothing capacitor is C, a voltage target value for the step-up circuit is Vo*, and the DC input voltage value is Vg, the following expression may be satisfied:

$$Iin^* = \{(Iinv^* \times Vinv^*) + C \times (dVo^*/dt) \times Vo^*\}/Vg.$$

(7) In the inverter device of the above (2), for example, in the case where the current target value for the step-up circuit is Iin*, the current target value and the voltage target value for the inverter circuit are Iinv* and Vinv*, respectively, a voltage target value for the step-up circuit is Vo*, the DC input voltage value is Vg, and current flowing through the smoothing capacitor is Ic, the following expression may be satisfied:

$$Iin^* = \{(Iinv^* \times Vinv^*) + Ic \times Vo^*\}/Vg.$$

(8) In the inverter device of the above (3), for example, in the case where the current target value for the step-up circuit is Iin*, the current target value and the voltage target value for the inverter circuit are Iinv* and Vinv*, respectively, an electrostatic capacitance of the smoothing capacitor is C, a voltage target value for the step-up circuit is Vo*, the DC input voltage value is Vg, and power loss of the inverter device is $P_{LOSS}$, the following expression may be satisfied:

$$Iin^* = \{(Iinv^* \times Vinv^*) + C \times (dVo^*/dt) \times Vo^* + P_{LOSS}\}/Vg.$$

(9) In the inverter device of the above (3), for example, in the case where the current target value for the step-up circuit is Iin*, the current target value and the voltage target value for the inverter circuit are Iinv* and Vinv*, respectively, a voltage target value for the step-up circuit is Vo*, the DC input voltage value is Vg, current flowing through the smoothing capacitor is Ic, and power loss of the inverter device is $P_{LOSS}$, the following expression may be satisfied:

$$Iin^* = \{(Iinv^* \times Vinv^*) + Ic \times Vo^* + P_{LOSS}\}/Vg.$$

(10) In the inverter device of any one of the above (4) to (9), the control unit may select, as the voltage target value for the step-up circuit, the larger one of the DC input voltage value and an absolute value of the voltage target value for the inverter circuit, and in the case where an inductance of the reactor is La, the voltage target value Vinv* for the inverter circuit may be calculated by the following expression:

$$Vinv^* = Va + La(dIinv^*/dt).$$

In the case of (10), the control unit performs control so that the step-up circuit is operated in the case of outputting voltage corresponding to the part where the absolute value of the voltage target value for the inverter circuit is higher than the DC input voltage value, and the inverter circuit is operated in the case of outputting voltage corresponding to the part where the absolute value of the voltage target value for the inverter circuit is lower than the DC input voltage value. Therefore, a potential difference in power stepped down by the inverter circuit can be reduced, and loss due to switching of the step-up circuit is reduced, whereby AC power can be outputted with increased efficiency. Further, since both the step-up circuit and the inverter circuit operate based on the voltage target value set by the control unit, occurrence of phase-deviation or distortion in AC current outputted from the inverter device can be suppressed even if operation is performed so as to alternately switch the high-frequency switching period between the two circuits.

(11) In the inverter device of any one of the above (1) to (10), preferably, the control unit may perform maximum power point tracking control for the power supply, based on average values of the DC input voltage value and a DC input current value of the DC power given from the power supply, the average values being respectively calculated from results of plural measurements of the DC input voltage value and the DC input current value.

In this case, even if DC power from the power supply varies to be unstable, the control unit can accurately obtain the DC input voltage value and the DC input current value as average values. As a result, the power supply can be appropriately controlled, and reduction in efficiency of the inverter device can be effectively suppressed.

(12) In the case where voltage or current of DC power outputted from the power supply to the conversion unit varies due to variation in impedance of the conversion unit or the like, the variation cycle coincides with a half cycle of the AC system.

Therefore, in the inverter device of the above (11), preferably, the average values of the DC input voltage value and the DC input current value may be respectively obtained from results of plural measurements of the DC input voltage value and the DC input current value performed at time intervals shorter than a half cycle of the AC system during a period that is an integer multiple of the half cycle of the AC system. In this case, even if the DC input voltage value and the DC input current value vary periodically, the DC input voltage value and the DC input current value can be accurately calculated.

(13) In the inverter device of the above (1) to (12), DC power may also be outputted from the AC system to the power supply. That is, if the phase of the current target value (Iinv*) and the phase of the voltage target value (Vinv*) for the inverter circuit are shifted from each other by 180 degrees, it is also possible to perform output in a reverse direction from the AC system to the power supply, through the same control of the current target value (Iin*).

Details of Embodiments

Hereinafter, embodiments of the present invention will be described with reference to the drawings.

1. First Embodiment 1.1 Overall Configuration

FIG. 1 is a block diagram showing an example of a system including an inverter device according to the first embodiment. In FIG. 1, a photovoltaic panel 2 as a DC power supply is connected to an input end of an inverter device 1, and an AC commercial power system 3 is connected to an output end of the inverter device 1. This system performs interconnection operation to convert DC power generated by the photovoltaic panel 2 to AC power and output the AC power to the commercial power system 3.

The inverter device 1 includes a step-up circuit 10 which receives DC power outputted from the photovoltaic panel 2, an inverter circuit 11 which converts power given from the step-up circuit 10 to AC power and outputs the AC power to the commercial power system 3, and a control unit 12 which controls operations of these circuits 10 and 11.

Figure 2:
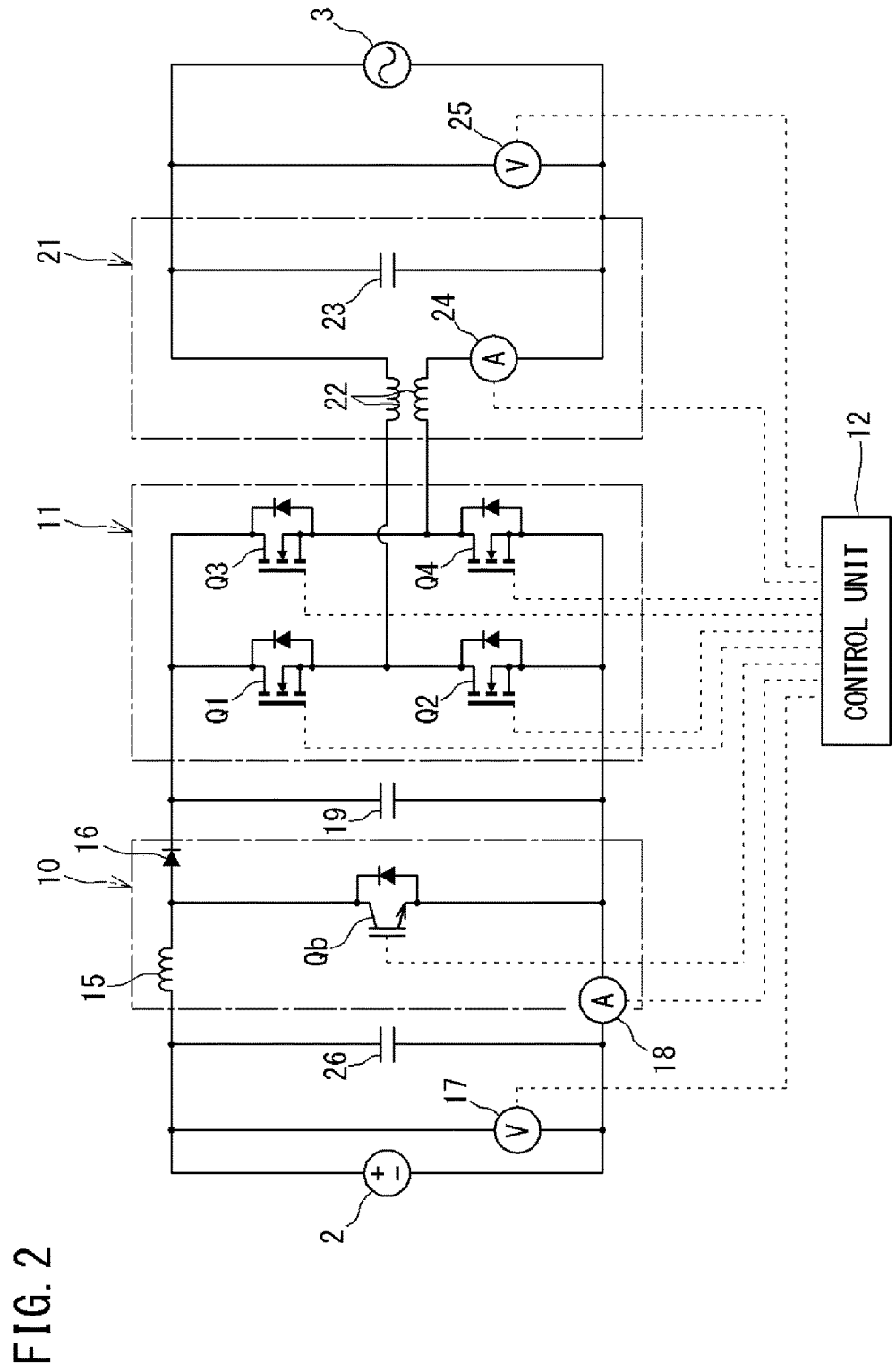
FIG. 2 is an example of a circuit diagram of the inverter device.

FIG. 2 is an example of a circuit diagram of the inverter device 1.

The step-up circuit 10 includes a DC reactor 15, a diode 16, and a switching element Qb composed of an Insulated Gate Bipolar Transistor (IGBT) or the like, to form a step-up chopper circuit.

On an input side of the step-up circuit 10, a first voltage sensor 17, a first current sensor 18, and a capacitor 26 for smoothing are provided.

The first voltage sensor 17 detects a DC input voltage detection value Vg (DC input voltage value) of DC power outputted from the photovoltaic panel 2 and then inputted to the step-up circuit 10, and outputs the DC input voltage detection value Vg to the control unit 12. The first current sensor 18 detects a step-up circuit current detection value Iin (DC input current value) of current flowing in the DC reactor 15, and outputs the step-up circuit current detection value Iin to the control unit 12. In order to detect a DC input current detection value Ig, a current sensor may be further provided at a stage preceding the capacitor 26.

The control unit 12 has a function of calculating input power Pin from the DC input voltage detection value Vg and the step-up circuit current detection value Iin and performing maximum power point tracking (MPPT) control for the photovoltaic panel 2.

The switching element Qb of the step-up circuit 10 is controlled so that a period in which switching operation is performed is alternately switched between the step-up circuit 10 and the inverter circuit 11 as described later. Therefore, during a period in which switching operation is performed in the step-up circuit 10, the step-up circuit 10 outputs stepped-up power to the inverter circuit 11, and during a period in which the switching operation is stopped, the step-up circuit 10 outputs, to the inverter circuit 11, DC power outputted from the photovoltaic panel 2 and then inputted to the step-up circuit 10, without stepping up the DC input voltage value thereof.

A capacitor 19 (smoothing capacitor) for smoothing is connected between the step-up circuit 10 and the inverter circuit 11.

The inverter circuit 11 includes switching elements Q1 to Q4 each composed of a Field Effect Transistor (FET). The switching elements Q1 to Q4 form a full-bridge circuit.

The switching elements Q1 to Q4 are connected to the control unit 12, and can be controlled by the control unit 12. The control unit 12 performs PWM control of operations of the switching elements Q1 to Q4. Thereby, the inverter circuit 11 converts power given from the step-up circuit 10 to AC power.

The inverter device 1 includes a filter circuit 21 between the inverter circuit 11 and the commercial power system 3.

The filter circuit 21 is composed of two AC reactors 22 and a capacitor 23 (output smoothing capacitor) provided at a stage subsequent to the AC reactors 22. The filter circuit 21 has a function to remove a high-frequency component contained in AC power outputted from the inverter circuit 11. The AC power from which the high-frequency component has been removed by the filter circuit 21 is given to the commercial power system 3.

Thus, the step-up circuit 10 and the inverter circuit 11 form a conversion unit which converts DC power outputted from the photovoltaic panel 2 to AC power and outputs the converted AC power to the commercial power system 3 via the filter circuit 21.

A second current sensor 24 for detecting an inverter current detection value Iinv (current flowing in the AC reactor 22) which is a current value of output of the inverter circuit 11 is connected to the filter circuit 21. A second voltage sensor 25 for detecting a voltage value (system voltage detection value Va) on the commercial power system 3 side is connected between the filter circuit 21 and the commercial power system 3.

The second current sensor 24 and the second voltage sensor 25 respectively output the detected inverter current detection value Iinv and the detected system voltage detection value Va (the voltage value of the AC system) to the control unit 12. Although the second current sensor 24 is provided at a stage preceding the capacitor 23 in FIG. 2, the second current sensor 24 may be provided at a stage subsequent to the capacitor 23.

The control unit 12 controls the step-up circuit 10 and the inverter circuit 11 based on the system voltage detection value Va, the inverter current detection value Iinv, the DC input voltage detection value Vg, and the step-up circuit current detection value Iin.

1.2 Control Unit

Figure 3:
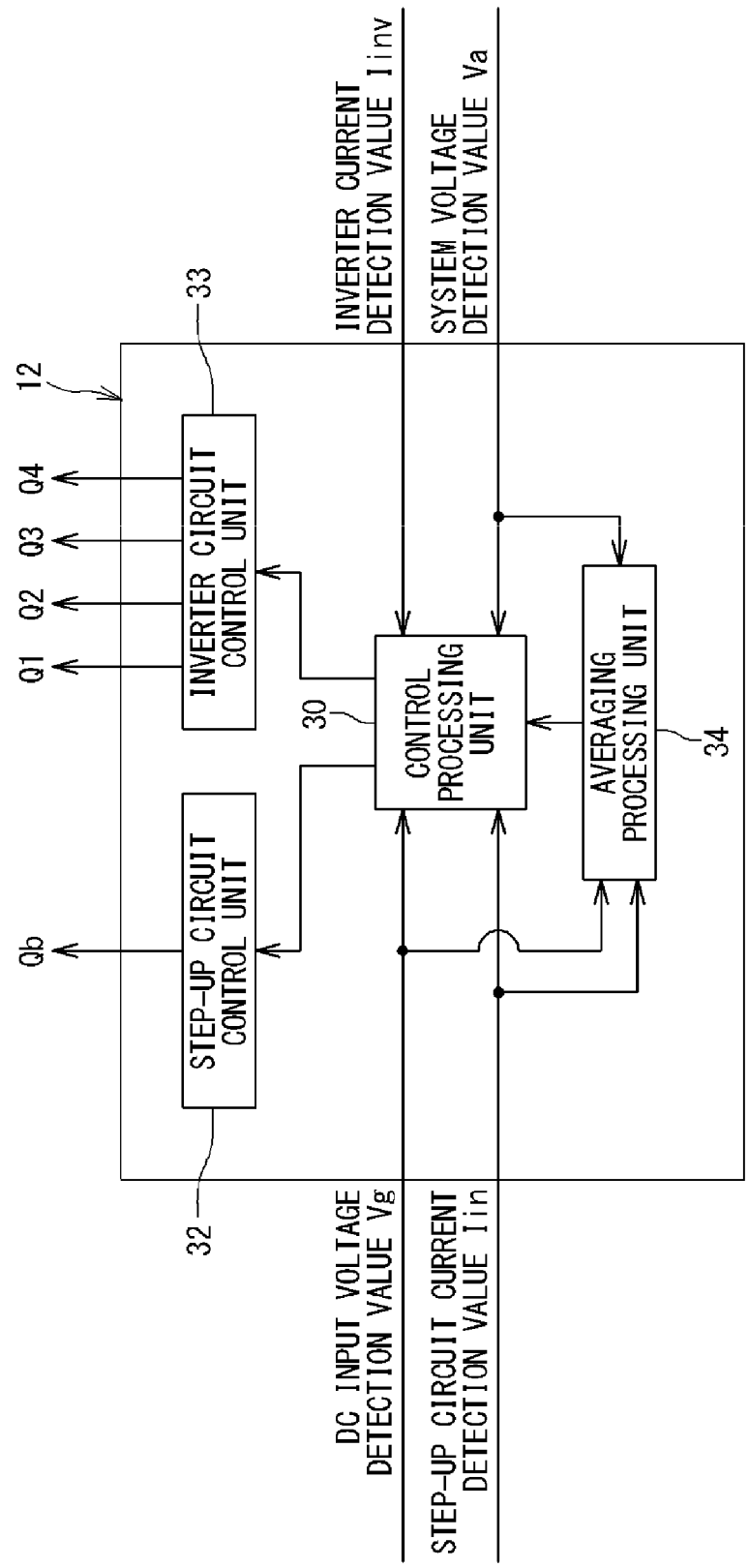
FIG. 3 is a block diagram of a control unit.

FIG. 3 is a block diagram of the control unit 12. As shown in FIG. 3, the control unit 12 functionally has a control processing unit 30, a step-up circuit control unit 32, an inverter circuit control unit 33, and an averaging processing unit 34.

Some or all of the functions of the control unit 12 may be configured as a hardware circuit, or may be realized by software (computer program) executed by a computer. Such software (computer program) for realizing a function of the control unit 12 is stored in a storage device (not shown) of the computer.

The step-up circuit control unit 32 controls the switching element Qb of the step-up circuit 10 based on a command value and a detection value given from the control processing unit 30, thereby causing the step-up circuit 10 to output power having current corresponding to the command value.

The inverter circuit control unit 33 controls the switching elements Q1 to Q4 of the inverter circuit 11 based on a command value and a detection value given from the control processing unit 30, thereby causing the inverter circuit 11 to output power having current corresponding to the command value.

The control processing unit 30 receives the DC input voltage detection value Vg, the step-up circuit current detection value Iin, the system voltage detection value Va, and the inverter current detection value Iinv.

The control processing unit 30 calculates the input power Pin and an average value <Pin> thereof from the DC input voltage detection value Vg and the step-up circuit current detection value Iin.

The control processing unit 30 has a function to set a DC input current command value Ig* (which will be described later) based on the input power average value <Pin> and perform MPPT control for the photovoltaic panel 2, and to perform feedback control for the step-up circuit 10 and the inverter circuit 11.

The DC input voltage detection value Vg and the step-up circuit current detection value Iin are given to the averaging processing unit 34 and the control processing unit 30.

The averaging processing unit 34 has a function to sample, at predetermined time intervals, the DC input voltage detection value Vg and the step-up circuit current detection value Iin given from the first voltage sensor 17 and the first current sensor 18, calculate their respective average values, and give the averaged DC input voltage detection value Vg and the averaged step-up circuit current detection value Iin to the control processing unit 30.

Figure 4:
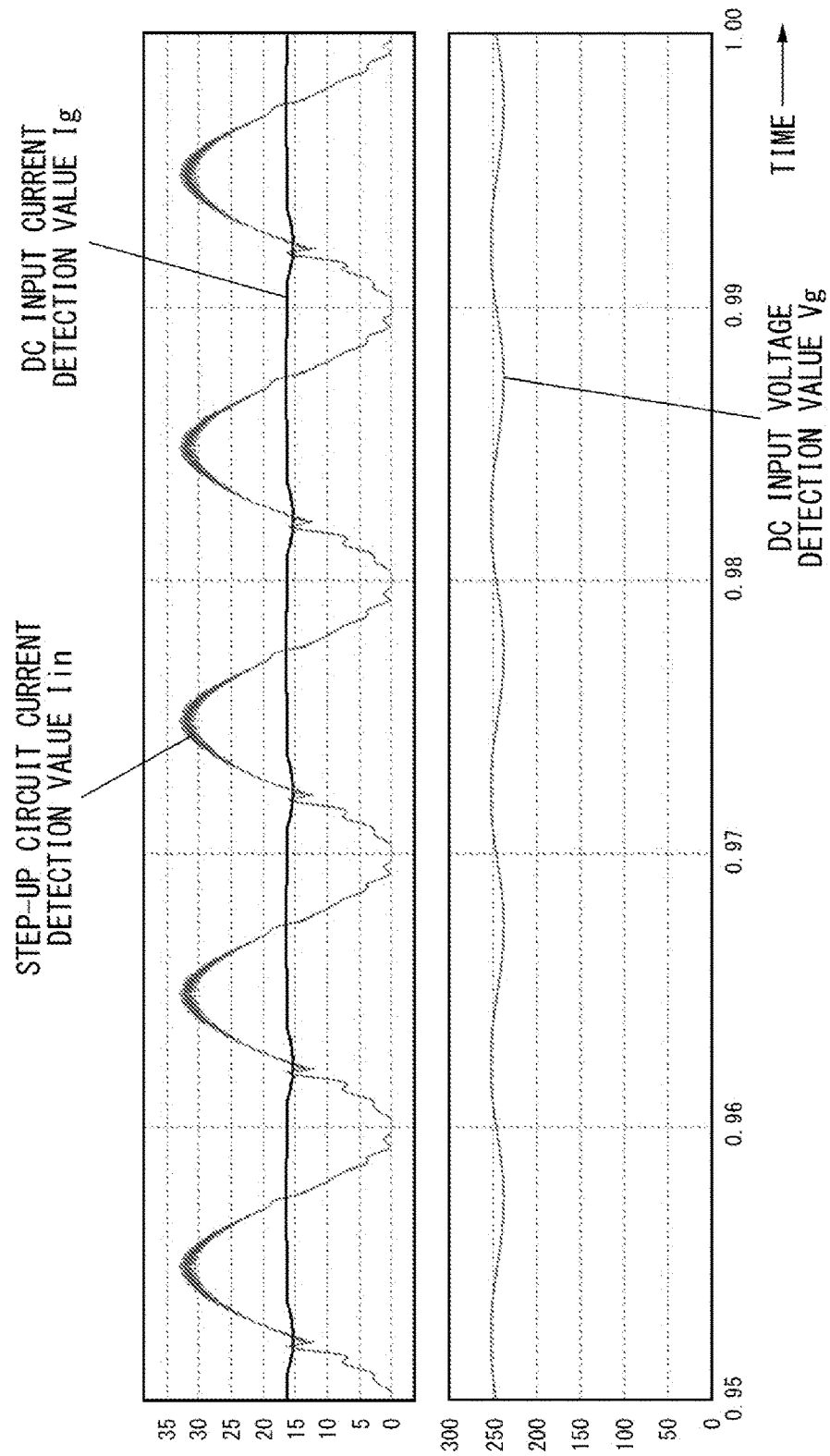
FIG. 4 is a graph showing an example of a simulation result of temporal variations in a DC input voltage detection value (the vertical axis indicates [V]) and a step-up circuit current detection value (the vertical axis indicates [A]).

FIG. 4 is a graph showing an example of a simulation result of temporal changes in the DC input voltage detection value Vg and the step-up circuit current detection value Iin.

The DC input current detection value Ig is a current value detected on an input side relative to the capacitor 26.

As shown in FIG. 4, it is found that the DC input voltage detection value Vg, the step-up circuit current detection value Iin, and the DC input current detection value Ig vary in a half cycle of the system voltage.

The reason why the DC input voltage detection value Vg and the DC input current detection value Ig vary periodically as shown in FIG. 4 is as follows. That is, the step-up circuit current detection value Iin greatly varies between almost 0A and a peak value in a half cycle of the AC cycle in accordance with operations of the step-up circuit 10 and the inverter circuit 11. Therefore, the variation component cannot be fully removed by the capacitor 26, and the DC input current detection value Ig is detected as pulsating current containing a component that varies in a half cycle of the AC cycle. On the other hand, output voltage of the photovoltaic panel varies depending on output current.

Therefore, the cycle of the periodic variation occurring in the DC input voltage detection value Vg is half the cycle of AC power outputted from the inverter device 1.

The averaging processing unit 34 averages the DC input voltage detection value Vg and the step-up circuit current detection value Iin in order to suppress an influence of the above periodic variations.

Figure 5:
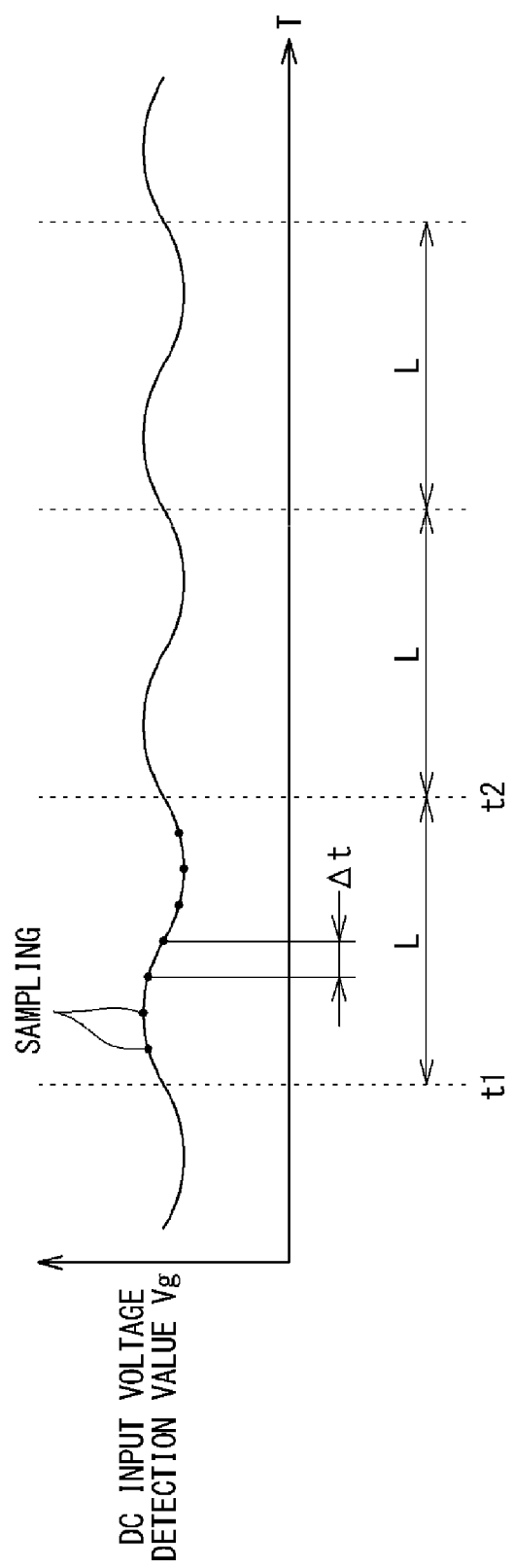
FIG. 5 is a diagram showing a manner in which an averaging processing unit averages a DC input voltage detection value Vg.

FIG. 5 is a diagram showing a manner in which the averaging processing unit 34 averages the DC input voltage detection value Vg.

The averaging processing unit 34 samples the given DC input voltage detection value Vg a plurality of times (at timings indicated by solid dots in FIG. 5) at predetermined time intervals Δt during a period L from a timing t1 to a timing t2, and calculates an average value of the plurality of DC input voltage detection values Vg that have been obtained.

Here, the averaging processing unit 34 sets the period L to half the length of the cycle of the commercial power system 3. In addition, the averaging processing unit 34 sets the time interval Δt to be sufficiently shorter than half the length of the cycle of the commercial power system 3.

Thus, the averaging processing unit 34 can accurately obtain the average value of the DC input voltage detection value Vg which periodically varies in synchronization with the cycle of the commercial power system 3, using as short a sampling period as possible.

The time interval Δt of sampling may be set at, for example, 1/100 to 1/1000 of the cycle of the commercial power system 3, or 20 microseconds to 200 microseconds.

The averaging processing unit 34 may store the period L in advance, or may acquire the system voltage detection value Va from the second voltage sensor 25 and set the period L based on the cycle of the commercial power system 3.

Here, the period L is set to half the length of the cycle of the commercial power system 3. The average value of the DC input voltage detection value Vg can be accurately calculated at least if the period L is set to half the cycle of the commercial power system 3. This is because the DC input voltage detection value Vg periodically varies in a half cycle of the commercial power system 3 in accordance with operations of the step-up circuit 10 and the inverter circuit 11 as described above.

Therefore, if it is required to set the period L to be longer, the period L may be set to an integer multiple of a half cycle of the commercial power system 3, e.g., three or four times of a half cycle of the commercial power system 3. Thus, the voltage variation can be grasped on a cycle basis.

As described above, the step-up circuit current detection value Iin also periodically varies in a half cycle of the commercial power system 3, as in the DC input voltage detection value Vg.

Therefore, the averaging processing unit 34 also calculates an average value of the step-up circuit current detection value Iin by the same method as in the DC input voltage detection value Vg shown in FIG. 5.

The control processing unit 30 sequentially calculates an average value of the DC input voltage detection value Vg and an average value of the step-up circuit current detection value Iin per the period L.

The averaging processing unit 34 gives the calculated average value of the DC input voltage detection value Vg and the calculated average value of the step-up circuit current detection value Iin to the control processing unit 30.

In the present embodiment, as described above, the averaging processing unit 34 calculates an average value (DC input voltage average value <Vg>) of the DC input voltage detection value Vg and an average value (step-up circuit current average value <Iin>) of the step-up circuit current detection value Iin, and using these values, the control processing unit 30 controls the step-up circuit 10 and the inverter circuit 11 while performing MPPT control for the photovoltaic panel 2. Therefore, even if DC current from the photovoltaic panel 2 varies to be unstable, the control unit 12 can accurately obtain output of the photovoltaic panel 2 as the DC input voltage average value <Vg> and the step-up circuit current average value <Iin> in which a variation component due to operation of the inverter device 1 has been removed. As a result, it becomes possible to appropriately perform MPPT control and effectively suppress reduction in power generation efficiency of the photovoltaic panel 2.

As described above, in the case where voltage (DC input voltage detection value Vg) or current (step-up circuit current detection value Iin) of DC power outputted from the photovoltaic panel 2 varies due to operation of the inverter device 1, the cycle of the variation coincides with a half cycle (a half cycle of the commercial power system 3) of AC power outputted from the inverter circuit 11.

In this regard, in the present embodiment, the DC input voltage detection value Vg and the step-up circuit current detection value Iin are each sampled a plurality of times at the time intervals Δt which are shorter than a half cycle of the AC system, during the period L which is set to half the length of the cycle of the commercial power system 3, and the DC input voltage average value <Vg> and the step-up circuit current average value <Iin> are calculated from a result of the sampling. Therefore, even if voltage and current of the DC current vary periodically, the DC input voltage average value <Vg> and the step-up circuit current average value <Iin> can be accurately calculated, with the sampling period shortened as much as possible.

The control processing unit 30 sets the DC input current command value Ig* based on the above input power average value <Pin>, and calculates respective command values for the step-up circuit 10 and the inverter circuit 11 based on the set DC input current command value Ig* and the above values.

The control processing unit 30 has a function of giving the calculated command values to the step-up circuit control unit 32 and the inverter circuit control unit 33 and performing feedback control for the step-up circuit 10 and the inverter circuit 11.

Figure 6:
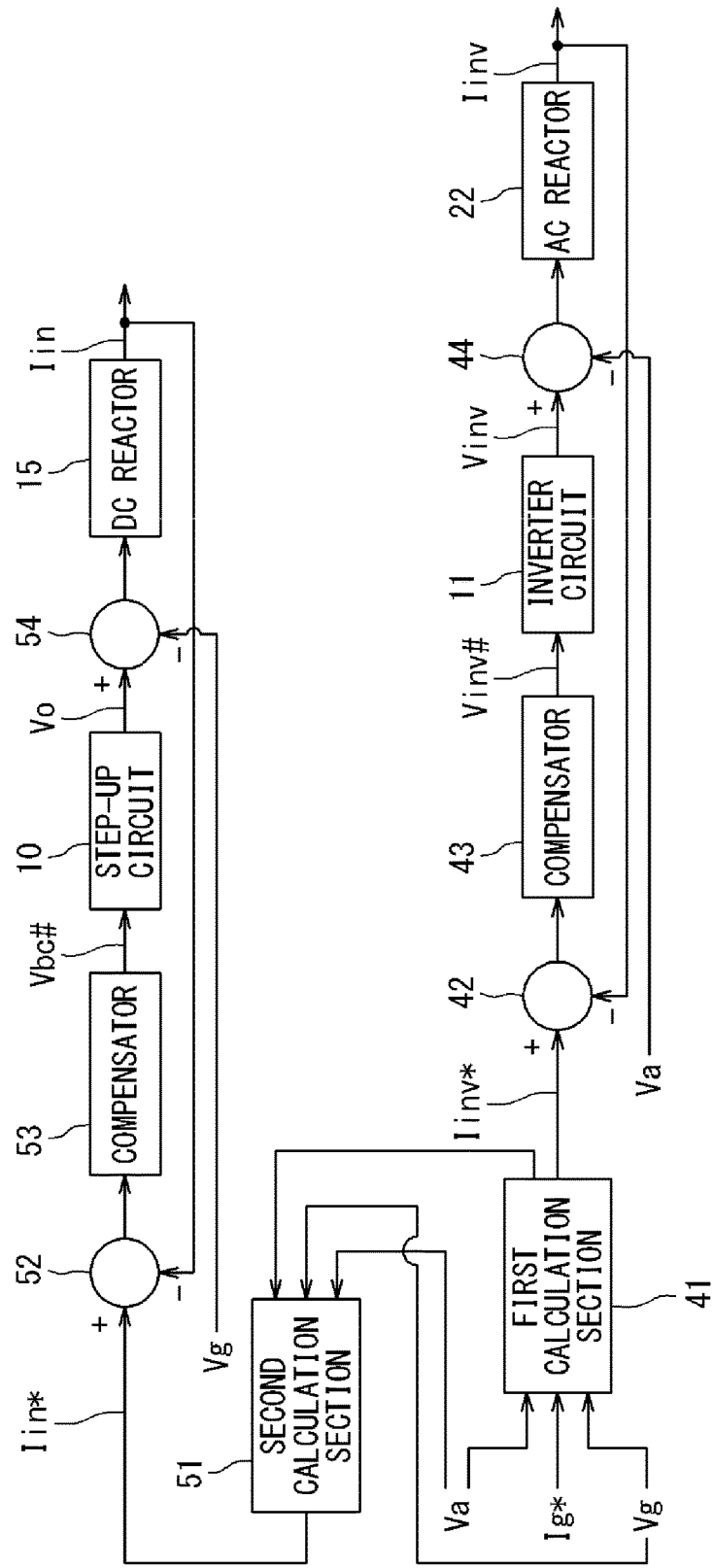
FIG. 6 is a control block diagram for explaining a control process by a control processing unit.

FIG. 6 is a control block diagram for explaining the feedback control for the step-up circuit 10 and the inverter circuit 11 by the control processing unit 30.

The control processing unit 30 includes, as function sections for controlling the inverter circuit 11, a first calculation section 41, a first adder 42, a compensator 43, and a second adder 44.

In addition, the control processing unit 30 includes, as a function section for controlling the step-up circuit 10, a second calculation section 51, a third adder 52, a compensator 53, and a fourth adder 54.

Figure 7:
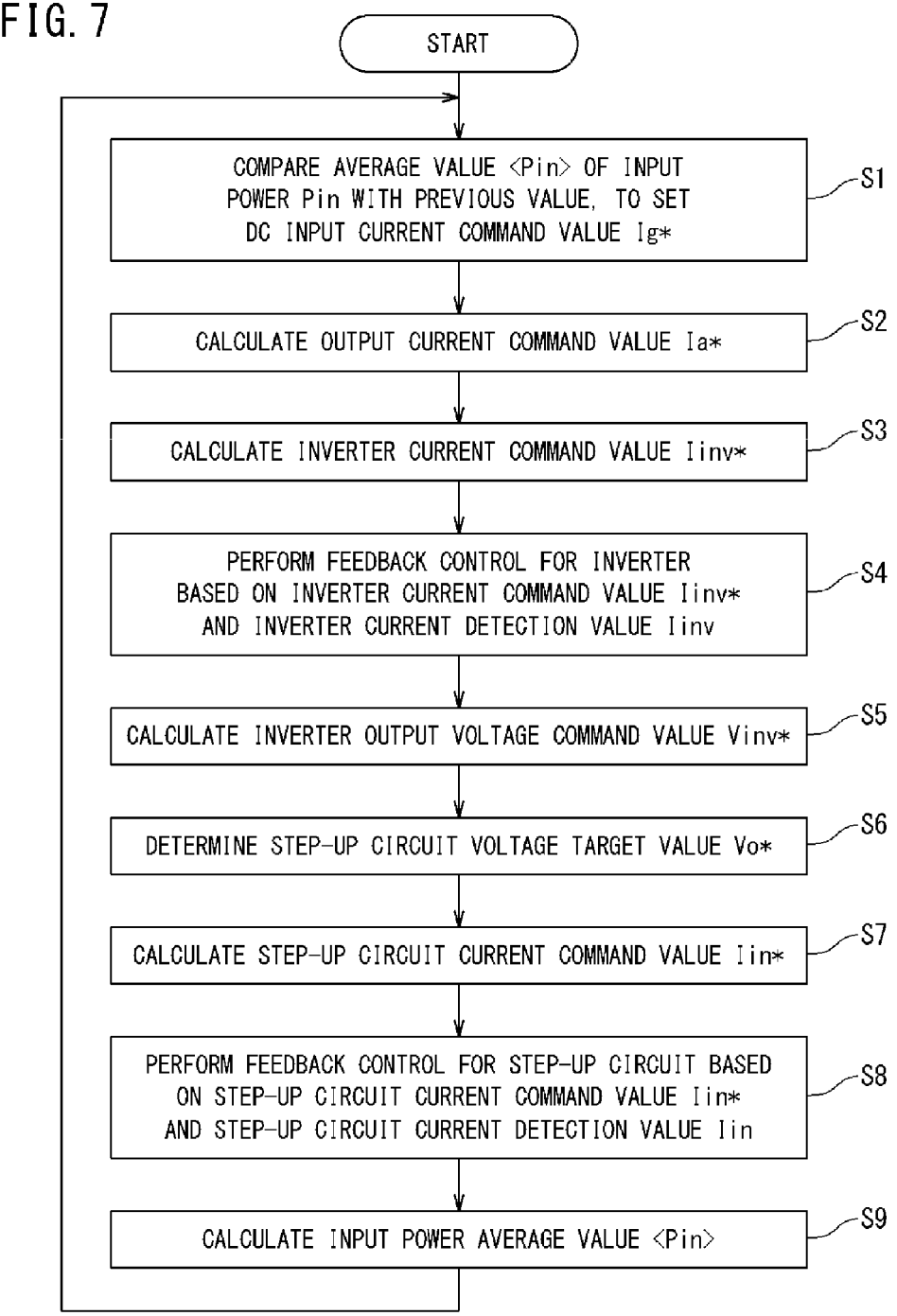
FIG. 7 is a flowchart showing a control process for a step-up circuit and an inverter circuit.

FIG. 7 is a flowchart showing a control process for the step-up circuit 10 and the inverter circuit 11. The function sections shown in FIG. 6 control the step-up circuit 10 and the inverter circuit 11 by executing the process shown in the flowchart in FIG. 7.

Hereinafter, the control process for the step-up circuit 10 and the inverter circuit 11 will be described with reference to FIG. 7.

First, the control processing unit 30 calculates the present input power average value <Pin> (step S9), and compares the present input power average value <Pin> with the input power average value <Pin> that has been previously calculated, to set the DC input current command value Ig* (step S1). The input power average value <Pin> is calculated based on the following expression (1).

$$\text{Input power average value } \langle Pin \rangle = \langle Iin \times Vg \rangle \quad (1)$$

In expression (1), Iin is the step-up circuit current detection value, and Vg is the DC input voltage detection value (DC input voltage value). For these values, the DC input voltage average value <Vg> and the step-up circuit current average value <Iin> which are the values averaged by the averaging processing unit 34 are used.

In each expression other than expression (1) and relevant to the control shown below, instantaneous values which are not averaged are used for the step-up circuit current detection value Iin and the DC input voltage detection value Vg.

A notation "< >" indicates an average value of a value in the brackets. The same applies hereinafter.

The control processing unit 30 gives the set DC input current command value Ig* to the first calculation section 41.

As well as the DC input current command value Ig*, the DC input voltage detection value Vg and the system voltage detection value Va are given to the first calculation section 41.

The first calculation section 41 calculates an average value <Ia*> of an output current command value for the inverter device 1, based on the following expression (2).

$$\text{Average value } \langle Ia^* \rangle \text{ of output current command value} = \langle Ig^* \times Vg \rangle / \langle Va \rangle \quad (2)$$

Further, the first calculation section 41 calculates an output current command value Ia* (output current target value) based on the following expression (3) (step S2).

Here, the first calculation section 41 calculates an output current command value Ia* as a sine wave having the same phase as the system voltage detection value Va.

$$\text{Output current command value } Ia^* = (\sqrt{2}) \times \langle Ia^* \rangle \times \sin \omega t \quad (3)$$

As described above, the first calculation section 41 calculates the output current command value Ia* based on the input power average value <Pin> (an input power value of DC power) and the system voltage detection value Va.

Next, the first calculation section 41 calculates an inverter current command value Iinv* (a current target value for the inverter circuit) which is a current target value for controlling the inverter circuit 11, as shown by the following expression (4) (step S3).

$$\text{Inverter current command value } I\text{inv}^* = Ia^* + sCaVa \tag{4}$$

In expression (4), Ca is an electrostatic capacitance of the capacitor 23 (output smoothing capacitor), and s is the Laplace operator.

The above expression (4) is represented as follows, using a derivative with respect to time t.

$$I\text{inv}^* = Ia^* + Ca \times (dVa/dt) \tag{4a}$$

If current flowing through the capacitor 23 is detected and the detected current is denoted by Ica, the following expression is obtained.

$$I\text{inv}^* = Ia^* + Ica \tag{4b}$$

In expressions (4), (4a), and (4b), the second term on the right-hand side is a value added in consideration of current flowing through the capacitor 23 of the filter circuit 21.

The output current command value Ia* is calculated as a sine wave having the same phase as the system voltage detection value Va, as shown by the above expression (3). That is, the control processing unit 30 controls the inverter circuit 11 so that current Ia (output current) of AC power outputted from the inverter device 1 has the same phase as the system voltage (system voltage detection value Va).

After calculating the inverter current command value Iinv*, the first calculation section 41 gives the inverter current command value Iinv* to the first adder 42.

The inverter circuit 11 is subjected to feedback control based on the inverter current command value Iinv*.

As well as the inverter current command value Iinv*, the present inverter current detection value Iinv is given to the first adder 42.

The first adder 42 calculates a difference between the inverter current command value Iinv* and the present inverter current detection value Iinv, and gives a result of the calculation to the compensator 43.

When the difference is given, the compensator 43 calculates, based on a proportionality coefficient or the like, an inverter voltage reference value Vinv# that allows the difference to converge so that the inverter current detection value Iinv becomes the inverter current command value Iinv*. The compensator 43 gives the inverter voltage reference value Vinv# to the inverter circuit control unit 33, thereby causing the inverter circuit 11 to output power with voltage Vinv according to the inverter voltage reference value Vinv#.

The power outputted from the inverter circuit 11, from which the system voltage detection value Va is subtracted by the second adder 44, is given to the AC reactor 22, and then fed back as a new inverter current detection value Iinv. Then, a difference between the inverter current command value Iinv* and the inverter current detection value Iinv is calculated again by the first adder 42, and the inverter circuit 11 is controlled based on the difference as described above.

As described above, the inverter circuit 11 is subjected to feedback control based on the inverter current command value Iinv* and the inverter current detection value Iinv (step S4).

On the other hand, the inverter current command value Iinv* calculated by the first calculation section 41, as well as the DC input voltage detection value Vg and the system voltage detection value Va, is given to the second calculation section 51.

The second calculation section 51 calculates an inverter output voltage command value Vinv* (a voltage target value for the inverter circuit) based on the following expression (5) (step S5).

$$\text{Inverter output voltage command value } V\text{inv}^* = Va + sLaI\text{inv}^* \tag{5}$$

In expression (5), La is an inductance of the AC reactor, and s is the Laplace operator.

The above expression (5) is represented as follows, using a derivative with respect to time t.

$$V\text{inv}^* = Va + La \times (dI\text{inv}^*/dt) \tag{5a}$$

In expressions (5) and (5a), the second term on the right-hand side is a value added in consideration of voltage generated between both ends of the AC reactor 22.

Thus, in the present embodiment, the inverter output voltage command value Vinv* (voltage target value) is set based on the inverter current command value Iinv* which is the current target value for controlling the inverter circuit 11 so that current of AC power outputted from the inverter circuit 11 has the same phase as the system voltage detection value Va.

After calculating the inverter output voltage command value Vinv*, the second calculation section 51 compares the DC input voltage detection value Vg with an absolute value of the inverter output voltage command value Vinv* and determines the greater one to be the step-up circuit voltage target value Vo* as shown by the following expression (6) (step S6).

$$\text{Step-up circuit voltage target value } Vo^* = \text{Max}(Vg, \text{absolute value of } V\text{inv}^*) \tag{6}$$

Further, the second calculation section 51 calculates a step-up circuit current command value Iin* based on the following expression (7) (step S7).

$$\text{Step-up circuit current command value } I\text{in}^* = \{(I\text{inv}^* \times V\text{inv}^*) + (sCVo^*) \times Vo^*\}/Vg \tag{7}$$

In expression (7), C is an electrostatic capacitance of the capacitor 19 (smoothing capacitor), and s is the Laplace operator.

The above expression (7) is represented as follows, using a derivative with respect to time t.

$$I\text{in}^* = \{(I\text{inv}^* \times V\text{inv}^*) + C \times (dVo^*/dt) \times Vo^*\}/Vg \tag{7a}$$

If current flowing through the capacitor 19 is detected and the detected current is denoted by Ic, the following expression is obtained.

$$I\text{in}^* = \{(I\text{inv}^* \times V\text{inv}^*) + Ic \times Vo^*\}/Vg \tag{7b}$$

In expressions (7), (7a), and (7b), a term added to a product of the inverter current command value Iinv* and the inverter output voltage command value Vinv* is a value added in consideration of reactive power passing through the capacitor 19. That is, consideration of the reactive power in addition to the power target value for the inverter circuit 11 allows for more accurate calculation of the value of Iin*.

Further, if power loss $P_{LOSS}$ of the inverter device 1 is measured in advance, the above expression (7a) can be represented as follows.

$$I\text{in}^* = \{(I\text{inv}^* \times V\text{inv}^*) + C \times (dVo^*/dt) \times Vo^* + P_{LOSS}\}/Vg \tag{7c}$$

Similarly, the above expression (7b) can be represented as follows.

$$I\text{in}^* = \{(I\text{inv}^* \times V\text{inv}^*) + Ic \times Vo^* + P_{LOSS}\}/Vg \tag{7d}$$

In this case, consideration of the reactive power and the power loss $P_{LOSS}$ in addition to the power target value of the inverter circuit 11 allows for more strict calculation of the value of Iin*.

If the electrostatic capacitance C and the power loss $P_{LOSS}$ of the capacitor 19 are sufficiently smaller than (Iinv*× Vinv*), the following expression (8) is obtained. Using the expression (8) simplifies calculation processing and shortens calculation time.

$$\text{Step-up circuit current command value } Iin^*=(Iinv^*\times Vinv^*)/Vg \qquad (8)$$

After calculating the step-up circuit current command value Iin*, the second calculation section 51 gives the step-up circuit current command value Iin* to the third adder 52.

The step-up circuit 10 is subjected to feedback control based on the step-up circuit current command value Iin*.

As well as the step-up circuit current command value Iin*, the present step-up circuit current detection value Iin is given to the third adder 52.

The third adder 52 calculates a difference between the step-up circuit current command value Iin* and the present step-up circuit current detection value Iin, and gives a result of the calculation to the compensator 53.

When the above difference is given, the compensator 53 calculates, based on a proportionality coefficient or the like, a step-up circuit voltage reference value Vbc# that allows the difference to converge so that the step-up circuit current detection value Iin becomes the step-up circuit current command value Iin*. The compensator 53 gives the step-up circuit voltage reference value Vbc# to the step-up circuit control unit 32, thereby causing the step-up circuit 10 to output power with voltage Vo according to the step-up circuit voltage reference value Vbc#.

The power outputted from the step-up circuit 10, from which the DC input voltage detection value Vg is subtracted by the fourth adder 54, is given to the DC reactor 15, and then fed back as a new step-up circuit current detection value Iin. Then, a difference between the step-up circuit current command value Iin* and the step-up circuit current detection value Iin is calculated again by the third adder 52, and the step-up circuit 10 is controlled based on the difference as described above.

As described above, the step-up circuit 10 is subjected to feedback control based on the step-up circuit current command value Iin* and the step-up circuit current detection value Iin (step S8).

After the above step S8, the control processing unit 30 calculates the present input power average value <Pin> based on the above expression (1) (step S9).

Based on comparison with the input power average value <Pin> that has been previously calculated, the control processing unit 30 sets the DC input current command value Ig* so that the input power average value <Pin> becomes a maximum value (follows the maximum power point).

Thus, the control processing unit 30 controls the step-up circuit 10 and the inverter circuit 11 while performing MPPT control for the photovoltaic panel 2.

As described above, the control processing unit 30 performs feedback control for the inverter circuit 11 and the step-up circuit 10 by the current command values.

Figure 8:
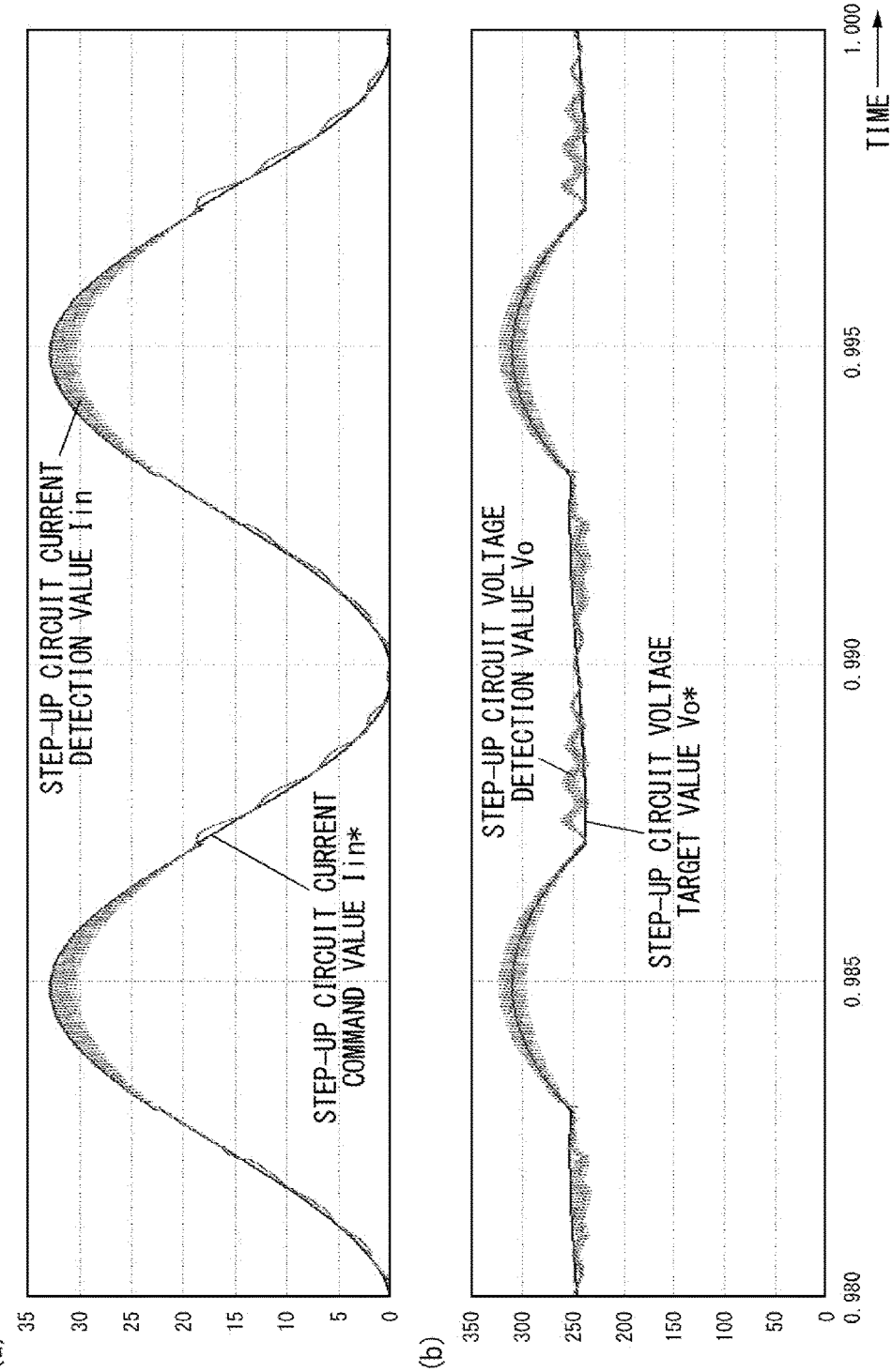
FIG. 8 is graphs in which (a) shows an example of a simulation result of a step-up circuit current command value calculated in a feedback control by the control processing unit, and a step-up circuit current detection value obtained when control is performed in accordance with the step-up circuit current command value, and (b) shows an example of a simulation result of a step-up circuit voltage target value calculated in the feedback control by the control processing unit, and a step-up circuit voltage detection value obtained when control is performed in accordance with the step-up circuit voltage target value (the vertical axis for voltage indicates [V], and the vertical axis for current indicates [A]).

FIG. 8 is graphs in which (a) shows an example of a simulation result of the step-up circuit current command value Iin* calculated in the above feedback control by the control processing unit 30, and the step-up circuit current detection value Iin obtained when control is performed in accordance with the step-up circuit current command value Iin*, and (b) shows an example of a simulation result of the step-up circuit voltage target value Vo* calculated in the above feedback control by the control processing unit 30, and the step-up circuit voltage detection value Vo obtained when control is performed in accordance with the step-up circuit voltage target value Vo*.

As shown in (a) of FIG. 8, it is found that the step-up circuit current detection value Iin is controlled along the step-up circuit current command value Iin* by the control processing unit 30.

As shown in (b) of FIG. 8, since the step-up circuit voltage target value Vo* is calculated by the above expression (6), the step-up circuit voltage target value Vo* varies so as to follow an absolute value of the inverter output voltage command value Vinv* during a period in which the absolute value of the inverter output voltage command value Vinv* is generally equal to or greater than the DC input voltage detection value Vg, and follow the DC input voltage detection value Vg during the other period.

It is found that the step-up circuit voltage detection value Vo is controlled along the step-up circuit voltage target value Vo* by the control processing unit 30.

Figure 9:
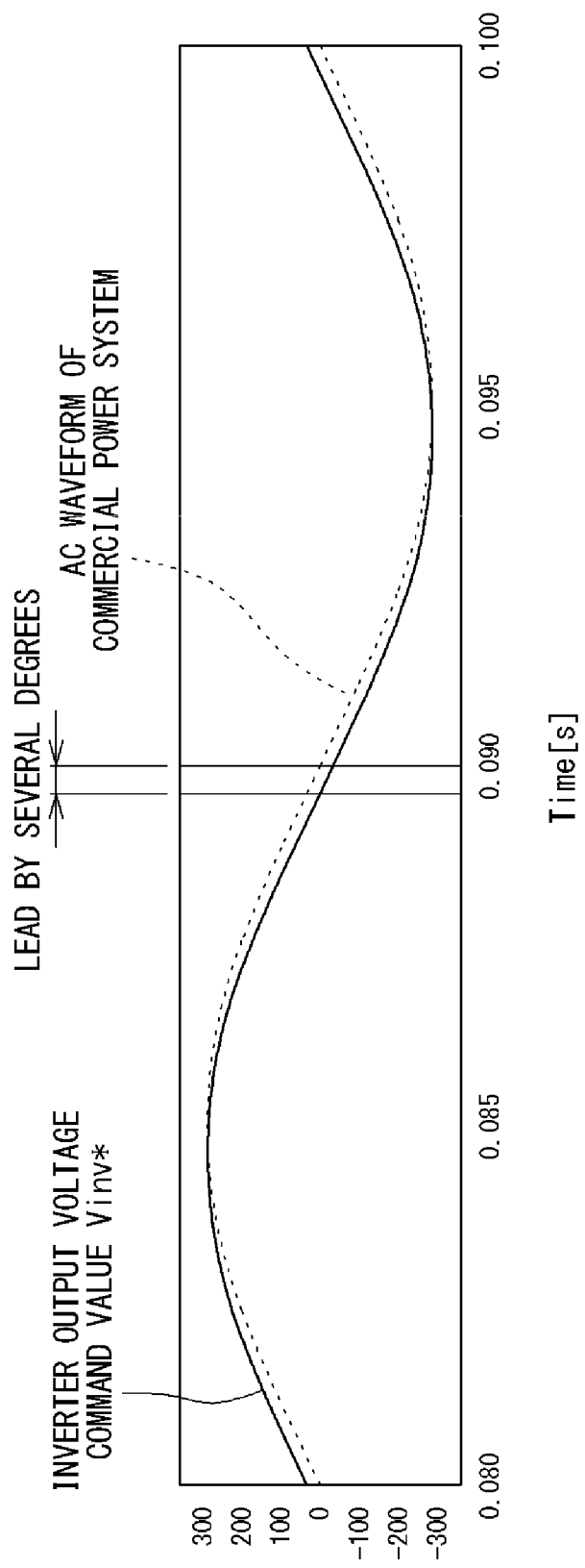
FIG. 9 is a diagram showing an example of an inverter output voltage command value (the vertical axis indicates [V]).

FIG. 9 is a diagram showing an example of the inverter output voltage command value Vinv*. In FIG. 9, the vertical axis indicates voltage and the horizontal axis indicates time. A broken line indicates a voltage waveform of the commercial power system 3, and a solid line indicates a waveform of the inverter output voltage command value Vinv*.

The inverter device 1 outputs power, using the inverter output voltage command value Vinv* shown in FIG. 9 as a voltage target value, through the control according to the flowchart in FIG. 7.

Therefore, the inverter device 1 outputs power having voltage according to the waveform of the inverter output voltage command value Vinv* shown in FIG. 9.

As shown in FIG. 9, the two waveforms have almost the same voltage value and the same frequency, but the phase of the inverter output voltage command value Vinv* leads the phase of voltage of the commercial power system 3 by several degrees.

The control processing unit 30 of the present embodiment causes the phase of the inverter output voltage command value Vinv* to lead the phase of voltage of the commercial power system 3 by about three degrees while executing the feedback control for the step-up circuit 10 and the inverter circuit 11, as described above.

The degree of angle by which the phase of the inverter output voltage command value Vinv* is caused to lead the phase of voltage of the commercial power system 3 may be several degrees, and as described later, the degree of angle is set within such a range that the phase of a voltage waveform of a difference from a voltage waveform of the commercial power system 3 leads the phase of the voltage waveform of the commercial power system 3 by 90 degrees. For example, the degree of the phase leading angle is set to be greater than 0 degrees and smaller than 10 degrees.

The degree of the phase leading angle is determined by the system voltage detection value Va, the inductance La of the AC reactor 22, and the inverter current command value Iinv* as shown by the above expression (5). Of these values, the system voltage detection value Va and the inductance La of the AC reactor 22 are fixed values that are not control targets. Therefore, the degree of the phase leading angle is determined by the inverter current command value Iinv*.

The inverter current command value Iinv* is determined by the output current command value Ia* as shown by the above expression (4). As the output current command value Ia* increases, a phase leading component of the inverter current command value Iinv* increases, and a leading angle (phase leading angle) of the inverter output voltage command value Vinv* increases.

Since the output current command value Ia* is calculated by the above expression (2), the phase leading angle is adjusted by the DC input current command value Ig*.

The control processing unit 30 of the present embodiment sets the DC input current command value Ig* so that the phase of the inverter output voltage command value Vinv* leads the phase of voltage of the commercial power system 3 by about three degrees, as described above.

1.3 Control for Step-Up Circuit and Inverter Circuit

The step-up circuit control unit 32 controls the switching element Qb of the step-up circuit 10. The inverter circuit control unit 33 controls the switching elements Q1 to Q4 of the inverter circuit 11.

The step-up circuit control unit 32 and the inverter circuit control unit 33 respectively generate a step-up circuit carrier wave and an inverter circuit carrier wave, and respectively modulate these carrier waves with the step-up circuit voltage reference value Vbc# and the inverter voltage reference value Vinv# which are command values given from the control processing unit 30, to generate drive waveforms for driving each switching element.

The step-up circuit control unit 32 and the inverter circuit control unit 33 control each switching element based on the drive waveforms, thereby causing the step-up circuit 10 and the inverter circuit 11 to output AC powers having current waveforms approximate to the step-up circuit current command value Iin* and the inverter current command value Iinv*, respectively.

Figure 10:
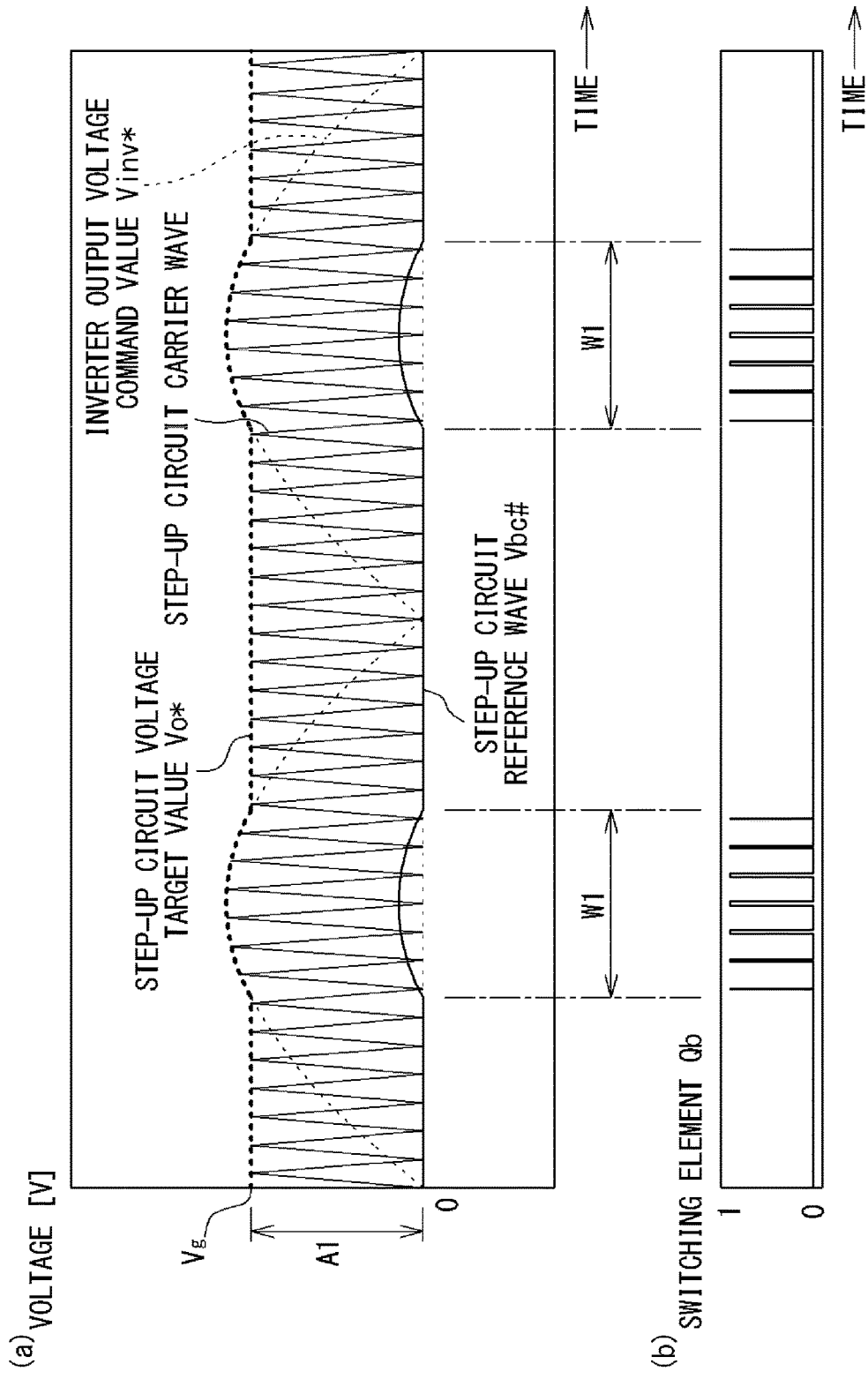
FIG. 10 is graphs in which (a) shows comparison between a step-up circuit carrier wave and a step-up circuit reference wave, and (b) shows a drive waveform for driving a switching element Qb, generated by a step-up circuit control unit.

In FIG. 10, (a) is a graph showing comparison between the step-up circuit carrier wave and a waveform of the step-up circuit voltage reference value Vbc#. In (a) of FIG. 10, the vertical axis indicates voltage and the horizontal axis indicates time. In (a) of FIG. 10, for facilitating the understanding, the wavelength of the step-up circuit carrier wave is elongated as compared to the actual wavelength.

The step-up circuit carrier wave generated by the step-up circuit control unit 32 is a triangle wave having a minimum value of "0", and has an amplitude A1 set at the step-up circuit voltage target value Vo* given from the control processing unit 30.

The frequency of the step-up circuit carrier wave is set by the step-up circuit control unit 32 in accordance with a control command from the control processing unit 30, so as to realize a predetermined duty cycle.

As described above, the step-up circuit voltage target value Vo* varies so as to follow an absolute value of the inverter output voltage command value Vinv* during a period W1 in which the absolute value of the inverter output voltage command value Vinv* is generally equal to or greater than the DC input voltage detection value Vg, and follow the DC input voltage detection value Vg during the other period. Therefore, the amplitude A1 of the step-up circuit carrier wave also varies in accordance with the step-up circuit voltage target value Vo*.

In the present embodiment, the DC input voltage detection value Vg is 250 volts, and the amplitude of voltage of the commercial power system 3 is 288 volts.

A waveform (hereinafter, may be referred to as a step-up circuit reference wave Vbc#) of the step-up circuit voltage reference value Vbc# corresponds to a value calculated based on the step-up circuit current command value Iin* by the control processing unit 30, and has a positive value during the period W1 in which the absolute value of the inverter output voltage command value Vinv* is greater than the DC input voltage detection value Vg. During the period W1, the step-up circuit reference wave Vbc# has a waveform approximate to the shape of a waveform created by the step-up circuit voltage target value Vo*, and crosses the step-up circuit carrier wave.

The step-up circuit control unit 32 compares the step-up circuit carrier wave with the step-up circuit reference wave Vbc#, and generates a drive waveform for driving the switching element Qb so as to be turned on during a period in which the step-up circuit reference wave Vbc# which is a target value for voltage between both ends of the DC reactor 15 is equal to or greater than the step-up circuit carrier wave, and to be turned off during a period in which the step-up circuit reference wave Vbc# is equal to or smaller than the carrier wave.

In FIG. 10, (b) shows the drive waveform for driving the switching element Qb, generated by the step-up circuit control unit 32. In (b) of FIG. 10, the vertical axis indicates voltage and the horizontal axis indicates time. The horizontal axis in (b) of FIG. 10 coincides with that in (a) of FIG. 10.

The drive waveform indicates switching operation of the switching element Qb. When the drive waveform is given to the switching element Qb, the switching element Qb is caused to perform switching operation in accordance with the drive waveform. The drive waveform forms a control command to turn off the switching element when the voltage is 0 volts and turn on the switching element when the voltage is a plus voltage.

The step-up circuit control unit 32 generates the drive waveform so that the switching operation is performed during the period W1 in which the absolute value of the inverter output voltage command value Vinv* is equal to or greater than the DC input voltage detection value Vg. Therefore, in a range in which the absolute value is equal to or smaller than the DC input voltage detection value Vg, the switching element Qb is controlled to stop the switching operation.

Each pulse width is determined by an intercept of the step-up circuit carrier wave which is a triangle wave. Therefore, the pulse width is greater at a part where voltage is higher.

As described above, the step-up circuit control unit 32 modulates the step-up circuit carrier wave with the step-up circuit reference wave Vbc#, to generate the drive waveform representing pulse widths for switching. The step-up circuit control unit 32 performs PWM control for the switching element Qb of the step-up circuit 10, based on the generated drive waveform.

In the case where a switching element Qbu that conducts current in a forward direction of the diode 16 is provided in parallel with the diode 16, a drive waveform inverted from the drive waveform for the switching element Qb is used for the switching element Qbu. In order to prevent the switching element Qb and the switching element Qbu from conducting currents at the same time, a dead time of about 1 microsecond is provided at a part where a drive pulse for the switching element Qbu shifts from OFF to ON.

Figure 11:
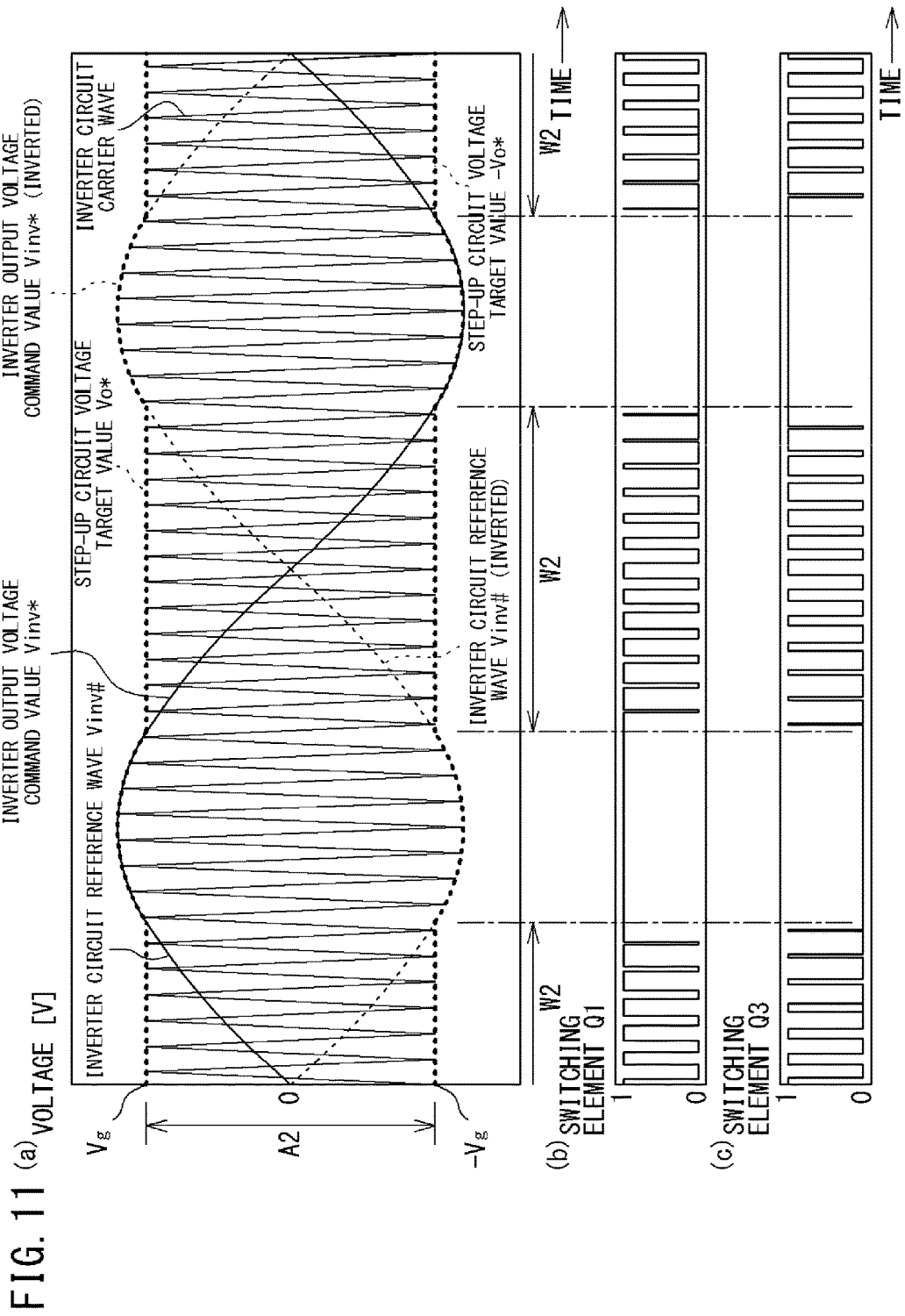
FIG. 11 is graphs in which (a) shows comparison between an inverter circuit carrier wave and an inverter circuit reference wave, (b) shows a drive waveform for driving a switching element Q1, generated by an inverter circuit control unit, and (c) shows a drive waveform for driving a switching element Q3, generated by the inverter circuit control unit.

In FIG. 11, (a) is a graph showing comparison between the inverter circuit carrier wave and a waveform of the inverter voltage reference value Vinv#. In (a) of FIG. 11, the vertical axis indicates voltage and the horizontal axis indicates time. Also in (a) of FIG. 11, for facilitating the understanding, the wavelength of the inverter circuit carrier wave is elongated as compared to the actual wavelength.

The inverter circuit carrier wave generated by the inverter circuit control unit 33 is a triangle wave having an amplitude center at 0 volts, and a one-side amplitude thereof is set at the step-up circuit voltage target value Vo* (a voltage target value for the capacitor 23). Therefore, the inverter circuit carrier wave has a period in which an amplitude A2 thereof is twice (500 volts) as great as the DC input voltage detection value Vg and a period in which the amplitude A2 is twice (576 volts at maximum) as great as voltage of the commercial power system 3.

The frequency thereof is set by the inverter circuit control unit 33 in accordance with a control command from the control processing unit 30, or the like, so as to realize a predetermined duty cycle.

As described above, the step-up circuit voltage target value Vo* varies to follow an absolute value of the inverter output voltage command value Vinv* during the period W1 in which the absolute value of the inverter output voltage command value Vinv* is generally equal to or greater than the DC input voltage detection value Vg, and follow the DC input voltage detection value Vg during the other period, i.e., a period W2. Therefore, the amplitude A2 of the inverter circuit carrier wave also varies in accordance with the step-up circuit voltage target value Vo*.

A waveform (hereinafter, may be referred to as an inverter circuit reference wave Vinv#) of the inverter voltage reference value Vinv# corresponds to a value calculated based on the inverter current command value Iinv* by the control processing unit 30, and is set to have generally the same amplitude as the voltage amplitude (288 volts) of the commercial power system 3. Therefore, the inverter circuit reference wave Vinv# crosses the inverter circuit carrier wave in a range where the voltage value is between −Vg and +Vg.

The inverter circuit control unit 33 compares the inverter circuit carrier wave with the inverter circuit reference wave Vinv#, and generates drive waveforms for driving the switching elements Q1 to Q4 so as to be turned on during a period in which the inverter circuit reference wave Vinv# which is a voltage target value is equal to or greater than the inverter circuit carrier wave, and to be turned off during a period in which the inverter circuit reference wave Vinv# is equal to or smaller than the carrier wave.

In FIG. 11, (b) shows the drive waveform for driving the switching element Q1, generated by the inverter circuit control unit 33. In (b) of FIG. 11, the vertical axis indicates voltage and the horizontal axis indicates time. The horizontal axis in (b) of FIG. 11 coincides with that in (a) of FIG. 11.

The inverter circuit control unit 33 generates the drive waveform so that the switching operation is performed in the range W2 in which voltage of the inverter circuit reference wave Vinv# is between −Vg and +Vg. Therefore, in the other range, the switching element Q1 is controlled to stop the switching operation.

In FIG. 11, (c) shows the drive waveform for driving the switching element Q3, generated by the inverter circuit control unit 33. In (c) of FIG. 11, the vertical axis indicates voltage and the horizontal axis indicates time.

The inverter circuit control unit 33 compares the carrier wave with a waveform indicated by a broken line in (a) of FIG. 11, which is inverted from the inverter circuit reference wave Vinv#, to generate the drive waveform for the switching element Q3.

Also in this case, the inverter circuit control unit 33 generates the drive waveform so that the switching operation is performed in the range W2 in which voltage of (a waveform inverted from) the inverter circuit reference wave Vinv# is between −Vg and +Vg. Therefore, in the other range, the switching element Q3 is controlled to stop the switching operation.

The inverter circuit control unit 33 generates, as the drive waveform for the switching element Q2, a waveform inverted from the drive waveform for the switching element Q1, and generates, as the drive waveform for the switching element Q4, a waveform inverted from the drive waveform for the switching element Q3.

As described above, the inverter circuit control unit 33 modulates the inverter circuit carrier wave with the inverter circuit reference wave Vinv#, to generate the drive waveforms representing pulse widths for switching. The inverter circuit control unit 33 performs PWM control for the switching elements Q1 to Q4 of the inverter circuit 11, based on the generated drive waveforms.

The step-up circuit control unit 32 of the present embodiment causes the step-up circuit 10 to output power so that current flowing in the DC reactor 15 coincides with the step-up circuit current command value Iin*. As a result, the step-up circuit 10 is caused to perform switching operation during the period W1 (FIG. 10) in which an absolute value of the inverter output voltage command value Vinv* is generally equal to or greater than the DC input voltage detection value Vg. The step-up circuit 10 outputs power having voltage equal to or greater than the DC input voltage detection value Vg and approximate to the absolute value of the inverter output voltage command value Vinv*, during the period W1. On the other hand, during the period in which the absolute value of the inverter output voltage command value Vinv* is generally equal to or smaller than the DC input voltage detection value Vg, the step-up circuit control unit 32 stops the switching operation of the step-up circuit 10. Therefore, during the period in which the absolute value is equal to or smaller than the DC input voltage detection value Vg, the step-up circuit 10 outputs, to the inverter circuit 11, DC power outputted from the photovoltaic panel 2 without stepping up the DC input voltage value thereof.

The inverter circuit control unit 33 of the present embodiment causes the inverter circuit 11 to output power so that current flowing in the AC reactor 22 coincides with the inverter current command value Iinv*. As a result, the inverter circuit 11 is caused to perform switching operation during the period W2 (FIG. 11) in which the inverter output voltage command value Vinv* is generally between −Vg and +Vg. That is, the inverter circuit 11 is caused to perform switching operation during a period in which an absolute value of the inverter output voltage command value Vinv* is equal to or smaller than the DC input voltage detection value Vg.

Therefore, while switching operation of the step-up circuit 10 is stopped, the inverter circuit 11 performs switching operation to output AC power approximate to the inverter output voltage command value Vinv*.

Since the inverter circuit reference wave Vinv# and the inverter output voltage command value Vinv* are approximate to each other, they overlap each other in (a) of FIG. 11.

On the other hand, in the period other than the period W2 in which voltage of the inverter output voltage command value Vinv* is generally between −Vg and +Vg, the inverter circuit control unit 33 stops the switching operation of the inverter circuit 11. During this period, power stepped up by the step-up circuit 10 is given to the inverter circuit 11. Therefore, the inverter circuit 11 whose switching operation is stopped outputs the power given from the step-up circuit 10, without stepping down the voltage thereof.

That is, the inverter device 1 of the present embodiment causes the step-up circuit 10 and the inverter circuit 11 to perform switching operations so as to be alternately switched therebetween, and superimposes their respective output powers on each other, thereby outputting AC power having a voltage waveform approximate to the inverter output voltage command value Vinv*.

Thus, in the present embodiment, control is performed so that the step-up circuit 10 is operated in the case of outputting voltage corresponding to the part where the absolute value of the inverter output voltage command value Vinv* is higher than the DC input voltage detection value Vg, and the inverter circuit 11 is operated in the case of outputting voltage corresponding to the part where the absolute value of the inverter output voltage command value Vinv* is lower than the DC input voltage detection value Vg. Therefore, since the inverter circuit 11 does not step down the power that has been stepped up by the step-up circuit 10, a potential difference in stepping down of the voltage can be reduced, whereby loss due to switching of the step-up circuit is reduced and AC power can be outputted with increased efficiency.

Further, since both the step-up circuit 10 and the inverter circuit 11 operate based on the inverter output voltage command value Vinv* (voltage target value) set by the control unit 12, occurrence of deviation or distortion between power of the step-up circuit and power of the inverter circuit which are outputted so as to be alternately switched can be suppressed.

Figure 12:
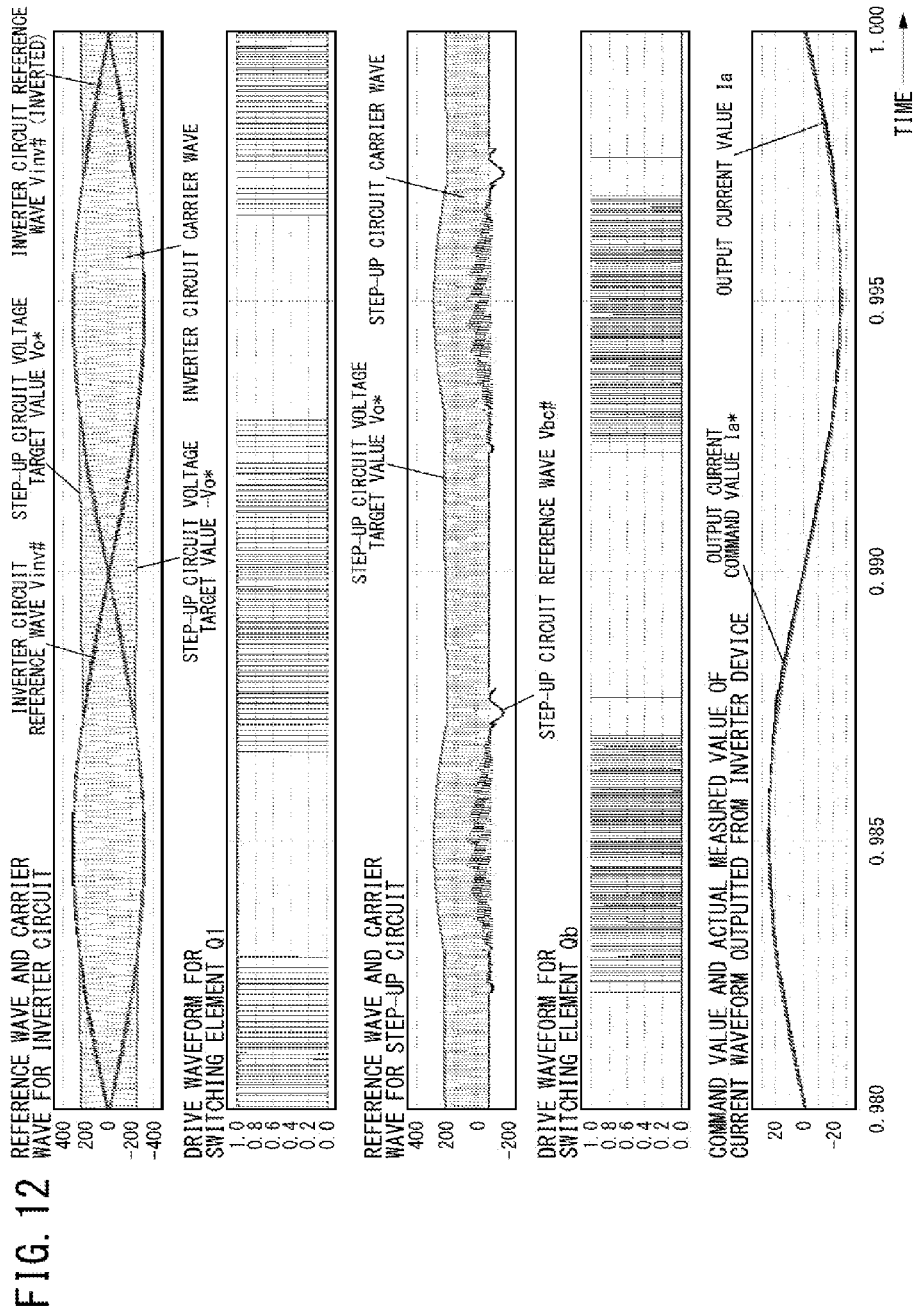
FIG. 12 is a diagram showing examples of reference waves and drive waveforms for switching elements, and an example of a current waveform of AC power outputted from the inverter device (the vertical axis for voltage indicates [V], and the vertical axis for current indicates [A]).

FIG. 12 is a diagram showing examples of the reference waves and the drive waveforms for the switching elements, and an example of a current waveform of AC power outputted from the inverter device 1.

FIG. 12 shows graphs of, from the uppermost side, the reference wave Vinv# and the carrier wave for the inverter circuit, the drive waveform for the switching element Q1, the reference wave Vbc# and the carrier wave for the step-up circuit, the drive waveform for the switching element Qb, and the command value and an actual measured value of a current waveform of AC power outputted from the inverter device 1. The horizontal axes of these graphs indicate time, and coincide with each other.

As shown in FIG. 12, it is found that output current is controlled so that an actual measured value Ia thereof coincides with a command value Ia*.

In addition, it is found that the period in which the switching element Qb of the step-up circuit 10 performs switching operation and the period in which the switching elements Q1 to Q4 of the inverter circuit 11 perform switching operations are controlled so as to be generally alternately switched therebetween.

In the present embodiment, as shown in (a) of FIG. 8, the step-up circuit is controlled so that current flowing in the DC reactor 15 coincides with the current command value Iin* calculated based on the above expression (7). As a result, voltages of the step-up circuit and the inverter circuit have waveforms as shown in (b) of FIG. 8, and it becomes possible to perform such an operation that high-frequency switching operations of the step-up circuit 10 and the inverter circuit 11 have respective stop periods and the switching operations are performed generally alternately.

1.4 Current Phase of Outputted AC Power

The step-up circuit 10 and the inverter circuit 11 of the present embodiment output AC power having a voltage waveform approximate to the inverter output voltage command value Vinv*, to the filter circuit 21 connected at the subsequent stage, through the control by the control unit 12. The inverter device 1 outputs AC power to the commercial power system 3 via the filter circuit 21.

Here, the inverter output voltage command value Vinv* is generated by the control processing unit 30 so as to have a voltage phase leading the voltage phase of the commercial power system 3 by several degrees as described above.

Therefore, AC voltage outputted by the step-up circuit 10 and the inverter circuit 11 also has a voltage phase leading the voltage phase of the commercial power system 3 by several degrees.

As a result, the AC voltage from the step-up circuit 10 and the inverter circuit 11 is applied to one end of the AC reactor 22 (FIG. 2) of the filter circuit 21, and voltage of the commercial power system 3 is applied to the other end. Thus, voltages having phases shifted from each other by several degrees are applied to the respective ends of the AC reactor 22.

Figure 13:
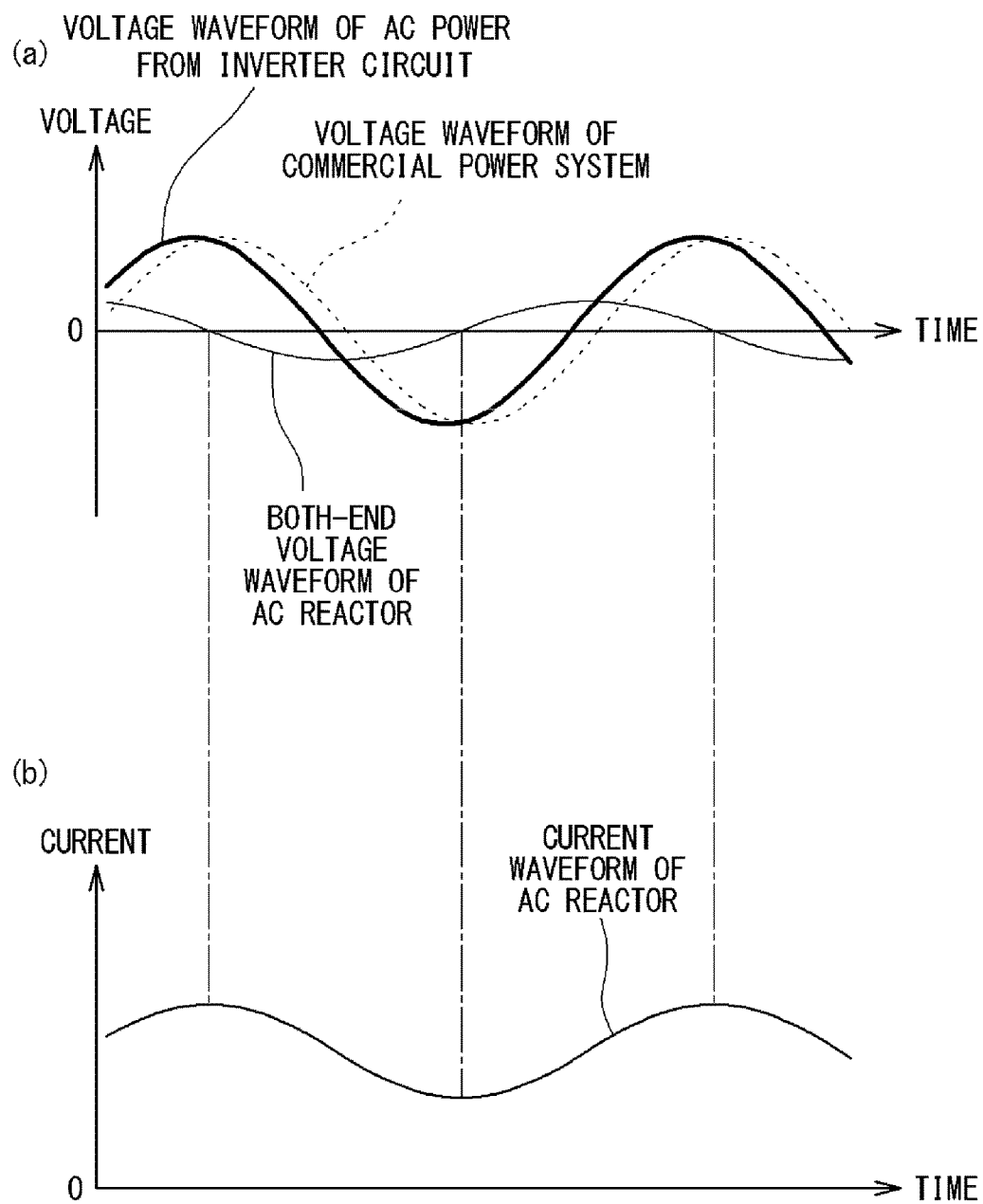
FIG. 13 is graphs in which (a) shows voltage waveforms of AC voltage outputted from the inverter circuit, a commercial power system, and voltage between both ends of an AC reactor, and (b) shows a waveform of current flowing in the AC reactor.

In FIG. 13, (a) is a graph showing voltage waveforms of AC voltage outputted from the inverter circuit 11, the commercial power system 3, and voltage between both ends of the AC reactor 22. In (a) of FIG. 13, the vertical axis indicates voltage and the horizontal axis indicates time.

As shown in (a) of FIG. 13, when voltages having phases shifted from each other by several degrees are applied to the respective ends of the AC reactor 22, the voltage between both ends of the AC reactor 22 is equal to a difference between the voltages applied to the respective ends of the AC reactor 22 and having phases shifted from each other by several degrees.

Therefore, as shown in (a) of FIG. 13, the phase of voltage between both ends of the AC reactor 22 leads the phase of voltage of the commercial power system 3 by 90 degrees.

In FIG. 13, (b) is a graph showing a waveform of current flowing in the AC reactor 22. In (b) of FIG. 13, the vertical axis indicates voltage and the horizontal axis indicates time. The horizontal axis in (b) of FIG. 13 coincides with that in (a) of FIG. 13.

The current phase of the AC reactor 22 lags the voltage phase thereof by 90 degrees. Therefore, as shown in (b) of FIG. 13, the current phase of AC power outputted through the AC reactor 22 is synchronized with the current phase of the commercial power system 3.

Therefore, although the phase of voltage outputted from the inverter circuit 11 leads the phase of the commercial power system 3 by several degrees, the phase of current outputted from the inverter circuit 11 coincides with the phase of current of the commercial power system 3.

Therefore, as shown in the lowermost graph in FIG. 12, the phase of a current waveform outputted from the inverter device 1 coincides with the voltage phase of the commercial power system 3.

As a result, AC current in phase with voltage of the commercial power system 3 can be outputted, whereby reduction in a power factor of the AC power can be suppressed.

2. Second Embodiment

Figure 14:
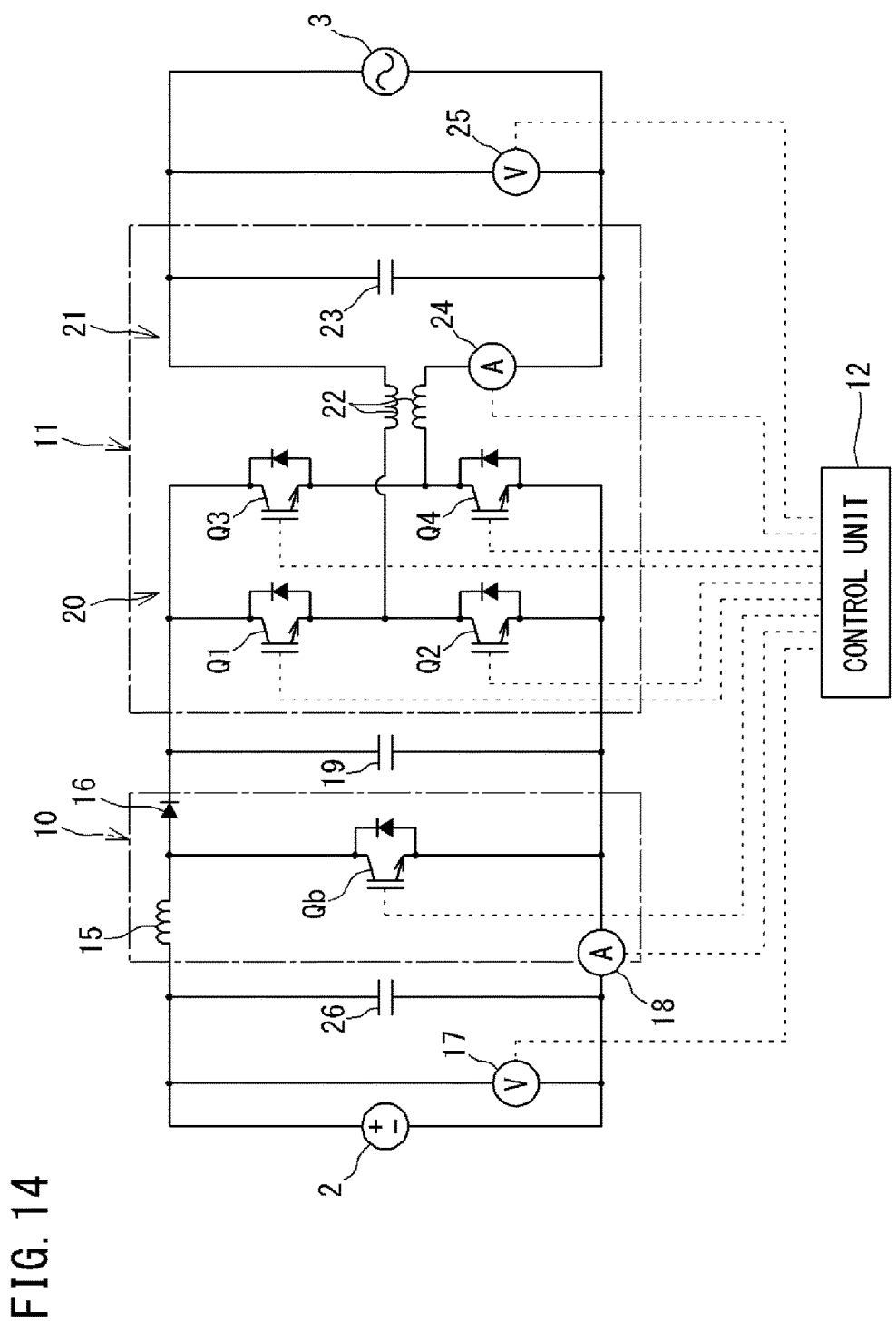
FIG. 14 is an example of a circuit diagram of an inverter device according to the second embodiment.

FIG. 14 is an example of a circuit diagram of an inverter device 1 according to the second embodiment.

A difference between the present embodiment and the first embodiment is that IGBTs are used as the switching elements Q1 to Q4 of the inverter circuit 11. The other configuration is the same as in the first embodiment.

In the present embodiment, the inverter circuit control unit 33 uses a carrier wave different from the inverter circuit carrier wave used in the above first embodiment.

Figure 15:
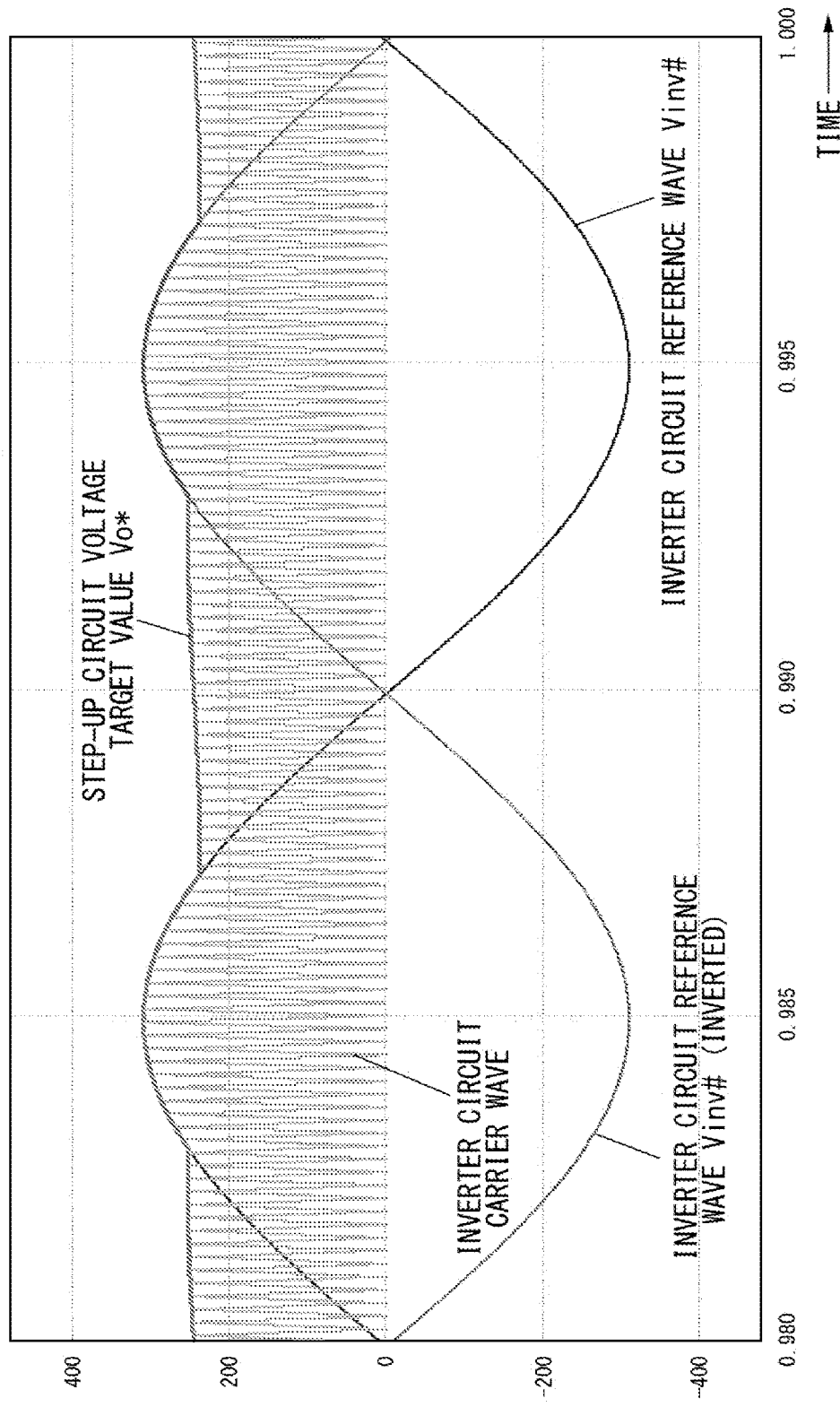
FIG. 15 is a graph showing comparison between an inverter circuit carrier wave in the second embodiment and a reference wave.

FIG. 15 is a graph showing comparison between an inverter circuit carrier wave in the second embodiment and a reference wave. In FIG. 15, the vertical axis indicates voltage and the horizontal axis indicates time.

The reference wave and a step-up circuit carrier wave are the same as those in the first embodiment.

On the other hand, the inverter circuit carrier wave of the present embodiment is a triangle wave having a lower limit value set at 0 volts and an upper limit value set at the step-up circuit voltage target value Vo*.

In this case, the inverter circuit control unit 33 generates a drive waveform for the switching element Q1 based on comparison between the inverter circuit reference wave Vinv# and the inverter circuit carrier wave, and generates a drive waveform for the switching element Q3 based on comparison between a wave inverted from the inverter circuit reference wave Vinv#, and the inverter circuit carrier wave.

Also in the present embodiment, the inverter circuit control unit 33 (step-up circuit control unit 32) compares the inverter circuit carrier wave (step-up circuit carrier wave) with the inverter circuit reference wave Vinv#, and generates drive waveforms for driving the switching elements so as to be turned on during a period in which the inverter circuit reference wave Vinv# (or a wave inverted therefrom) which is a voltage target value is equal to or greater than the inverter circuit carrier wave (step-up circuit carrier wave), and to be turned off during a period in which the inverter circuit reference wave Vinv# (or a wave inverted therefrom) is equal to or smaller than the carrier wave.

FIG. 16 is a diagram showing examples of the drive waveforms for the switching elements Qb and Q1 to Q4, and an example of a current waveform of AC power outputted from the inverter device 1, in the second embodiment.

FIG. 16 shows graphs of, from the uppermost side, the drive waveform for the switching element Q1, the drive waveform for the switching element Q4, the drive waveform for the switching element Q3, the drive waveform for the switching element Q2, the drive waveform for the switching element Qb, and a current waveform of AC power outputted from the inverter device 1. The horizontal axes of these graphs indicate time, and coincide with each other.

In the present embodiment, the switching element Q1 and the switching element Q3 are controlled to perform switching in a range where voltage of the inverter circuit reference wave Vinv# is between −Vg and +Vg.

Also in the present embodiment, as shown in FIG. 16, it is found that the period in which the switching element Qb of the step-up circuit 10 performs switching operation and the period in which the switching elements Q1 to Q4 of the inverter circuit 11 perform switching operations are controlled so as to be alternately switched therebetween.

The phase of a current waveform of AC power outputted from the inverter device 1 of the present embodiment coincides with the voltage phase of the commercial power system 3, as shown in FIG. 16. Therefore, as in the above first embodiment, AC power having the same current phase as the commercial power system 3 can be outputted, whereby reduction in a power factor of the AC power can be suppressed.

3. Third Embodiment

Figure 17:
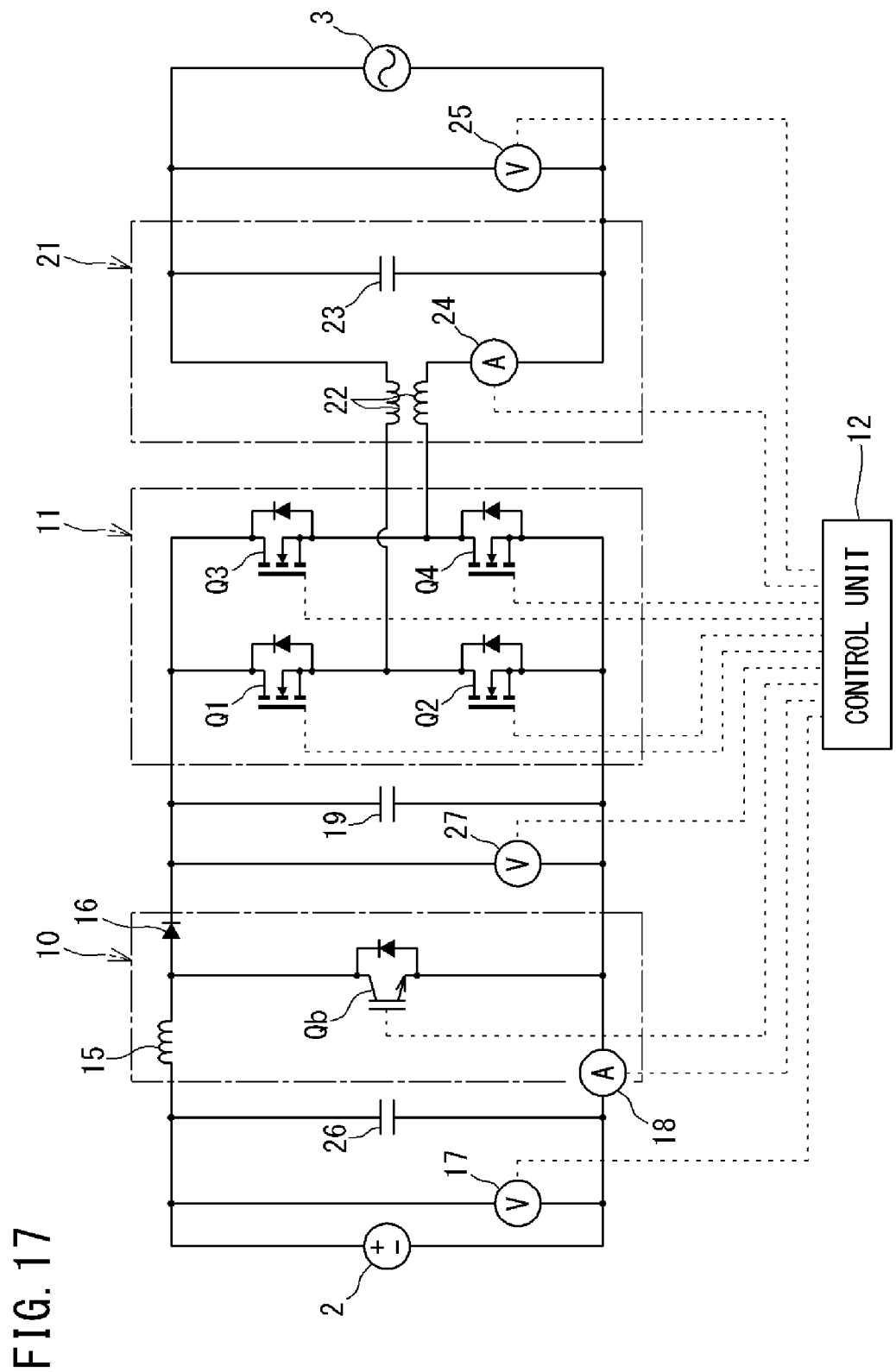
FIG. 17 is an example of a circuit diagram of an inverter device 1 according to the third embodiment.

FIG. 17 shows an example of a circuit diagram of an inverter device 1 according to the third embodiment.

A difference between the present embodiment and the first embodiment is that a third voltage sensor 27 for detecting intermediate voltage between the step-up circuit 10 and the inverter circuit 11 is provided. The other configuration is the same as in the first embodiment.

In the above first embodiment, the step-up circuit voltage target value Vo* (a target value of the intermediate voltage) is used as the amplitude of the carrier wave, but in the present embodiment, the voltage detection value Vo detected by the third voltage sensor 27 is used as the amplitude of the carrier wave.

Figure 18:
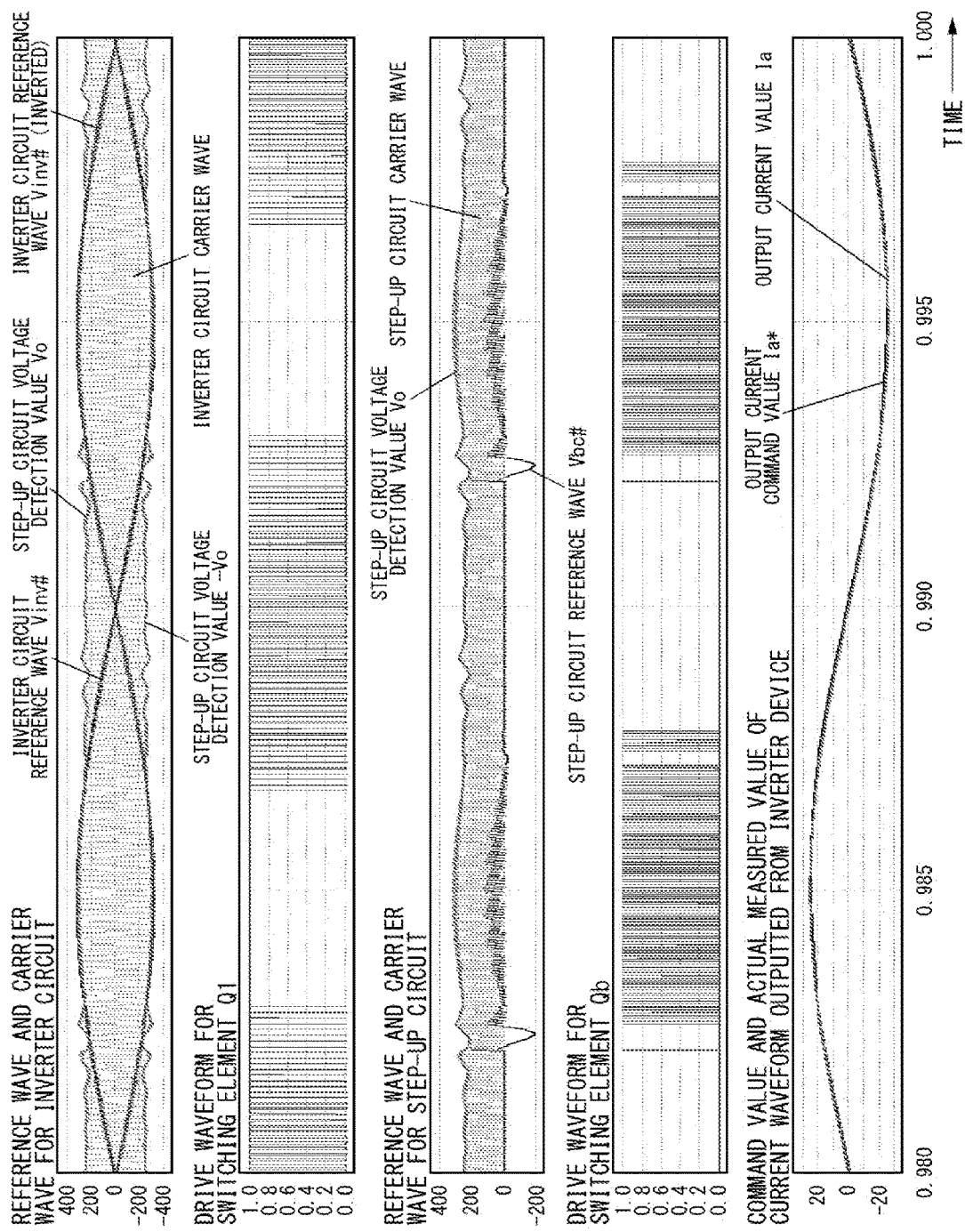
FIG. 18 is a diagram showing examples of reference waves and drive waveforms for switching elements, and an example of a current waveform of AC power outputted from the inverter device, in the third embodiment (the vertical axis for voltage indicates [V], and the vertical axis for current indicates [A]).

FIG. 18 is a diagram showing examples of the reference waves and the drive waveforms for the switching elements, and an example of a current waveform of AC power outputted from the inverter device 1, in the third embodiment.

FIG. 18 shows graphs of, from the uppermost side, the reference wave Vinv# and the carrier wave for the inverter circuit, the drive waveform for the switching element Q1, the reference wave Vbc# and the carrier wave for the step-up circuit, the drive waveform for the switching element Qb, and the command value Ia* and the actual measured value Ia of a current waveform of AC power outputted from the inverter device 1. The horizontal axes of these graphs indicate time, and coincide with each other.

As shown in FIG. 18, also in the present embodiment, it is found that output current is controlled so that the actual measured value Ia thereof coincides with the command value Ia*.

In addition, it is found that the period in which the switching element Qb of the step-up circuit 10 performs switching operation and the period in which the switching element Q1 of the inverter circuit 11 performs switching operation are controlled so as to be generally alternately switched therebetween.

As in the present embodiment, if the voltage detection value Vo is used as the amplitude of the carrier wave, response to variation in voltage of the photovoltaic panel 2 or the commercial power system 3 becomes fast, and output current of the inverter device 1 can be stabilized.

4. Supplementary Note

It has been verified that the same result as in each simulation in the above embodiments can be obtained using an actual machine.

It is noted that the embodiments disclosed herein are merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST

1 inverter device
2 photovoltaic panel
3 commercial power system
10 step-up circuit
11 inverter circuit
12 control unit
15 DC reactor
16 diode
17 first voltage sensor
18 first current sensor
19 capacitor (smoothing capacitor)
21 filter circuit 22 AC reactor
23 capacitor (output smoothing capacitor)
24 second current sensor
25 second voltage sensor
26 capacitor
27 voltage sensor
30 control processing unit
32 step-up circuit control unit
33 inverter circuit control unit
34 averaging processing unit
41 first calculation section
42 first adder
43 compensator
44 second adder
51 second calculation section
52 third adder
53 compensator
54 fourth adder
Q1 to Q4, Qb switching element

The invention claimed is:

1. An inverter device connected to an AC system via a reactor, the inverter device comprising:
a conversion unit configured to convert DC power outputted from a power supply, to AC power, and output the converted AC power to the AC system via the reactor; and
a control unit configured to control the conversion unit, wherein
the conversion unit includes:
a step-up circuit configured to step up a DC input voltage value of the DC power; and
an inverter circuit configured to convert power given from the step-up circuit, to AC power, and
the control unit
calculates an output current target value based on an input power value of the DC power and a voltage value of the AC system, and calculates a current target value and a voltage target value for the inverter circuit based on the output current target value, to control the inverter circuit, and
calculates a current target value for the step-up circuit based on a current target value and a voltage target value that are common with the inverter circuit, and on the DC input voltage value, to control the step-up circuit, and
thereby controls output of the AC power.

2. The inverter device according to claim 1, wherein
a smoothing capacitor is provided between the step-up circuit and the inverter circuit, and
the current target value for the step-up circuit is calculated based on the DC input voltage value and on a value obtained by adding reactive power passing through the smoothing capacitor to a power target value that is based on the current target value and the voltage target value for the inverter circuit.

3. The inverter device according to claim 1, wherein
a smoothing capacitor is provided between the step-up circuit and the inverter circuit, and
the current target value for the step-up circuit is calculated based on the DC input voltage value and on a value obtained by adding reactive power passing through the smoothing capacitor and power loss in the inverter device to a power target value that is based on the current target value and the voltage target value for the inverter circuit.

4. The inverter device according to claim 1, wherein
an output smoothing capacitor is provided at a stage subsequent to the reactor, and
in the case where the current target value for the step-up circuit is Iin*, the current target value and the voltage target value for the inverter circuit are Iinv* and Vinv*, respectively, the output current target value is IA*, an electrostatic capacitance of the output smoothing capacitor is Ca, the voltage value of the AC system is Va, and the DC input voltage value is Vg, the following expressions are satisfied:

$Iin^* = (Iinv^* \times Vinv^*)/Vg$ $Iinv^* = Ia^* + Ca \times (dVa/dt)$.

5. The inverter device according to claim 1, wherein
an output smoothing capacitor is provided at a stage subsequent to the reactor, and
in the case where the current target value for the step-up circuit is Iin*, the current target value and the voltage target value for the inverter circuit are Iinv* and Vinv*, respectively, the voltage value of the AC system is Va, the output current target value is Ia*, the DC input voltage value is Vg, and current flowing through the output smoothing capacitor is Ica, the following expressions are satisfied:

$Iin^* = (Iinv^* \times Vinv^*)/Vg$ $Iinv^* = Ia^* + Ica$.

6. The inverter device according to claim 2, wherein
in the case where the current target value for the step-up circuit is Iin*, the current target value and the voltage target value for the inverter circuit are Iinv* and Vinv*, respectively, an electrostatic capacitance of the smoothing capacitor is C, a voltage target value for the step-up circuit is Vo*, and the DC input voltage value is Vg, the following expression is satisfied:

$Iin^* = \{(Iinv^* \times Vinv^*) + C \times (dVo^*/dt) \times Vo^*\}/Vg$.

7. The inverter device according to claim 2, wherein
in the case where the current target value for the step-up circuit is Iin*, the current target value and the voltage target value for the inverter circuit are Iinv* and Vinv*, respectively, a voltage target value for the step-up circuit is Vo*, the DC input voltage value is Vg, and current flowing through the smoothing capacitor is Ic, the following expression is satisfied:

$Iin^* = \{(Iinv^* \times Vinv^*) + Ic \times Vo^*\}/Vg$.

8. The inverter device according to claim 3, wherein
in the case where the current target value for the step-up circuit is Iin*, the current target value and the voltage target value for the inverter circuit are Iinv* and Vinv*, respectively, an electrostatic capacitance of the smoothing capacitor is C, a voltage target value for the step-up circuit is Vo*, the DC input voltage value is Vg, and power loss of the inverter device is $P_{LOSS}$, the following expression is satisfied:

$Iin^* = \{(Iinv^* \times Vinv^*) + C \times (dVo^*/dt) \times Vo^* + P_{LOSS}\}/Vg$.

9. The inverter device according to claim 3, wherein
in the case where the current target value for the step-up circuit is Iin*, the current target value and the voltage target value for the inverter circuit are Iinv* and Vinv*, respectively, a voltage target value for the step-up circuit is Vo*, the DC input voltage value is Vg, current flowing through the smoothing capacitor is Ic, and power loss of the inverter device is $P_{LOSS}$, the following expression is satisfied:

$$Iin^* = \{(Iinv^* \times Vinv^*) + Ic \times Vo^* + P_{LOSS}\}/Vg.$$

10. The inverter device according to claim 4, wherein the control unit selects, as the voltage target value for the step-up circuit, the larger one of the DC input voltage value and an absolute value of the voltage target value for the inverter circuit, and
in the case where an inductance of the reactor is La, the voltage target value Vinv* for the inverter circuit is calculated by the following expression:

$$Vinv^* = Va + La(dIinv^*/dt).$$

11. The inverter device according to claim 1, wherein the control unit performs maximum power point tracking control for the power supply, based on average values of the DC input voltage value and a DC input current value of the DC power given from the power supply, the average values being respectively calculated from results of plural measurements of the DC input voltage value and the DC input current value.

12. The inverter device according to claim 11, wherein the average values of the DC input voltage value and the DC input current value are respectively obtained from results of plural measurements of the DC input voltage value and the DC input current value performed at time intervals shorter than a half cycle of the AC system during a period that is an integer multiple of the half cycle of the AC system.

13. The inverter device according to claim 1, wherein DC power is outputted from the AC system to the power supply.

* * * * *